United States Patent
Jeffrey et al.

[11] Patent Number: 5,544,168
[45] Date of Patent: Aug. 6, 1996

[54] ATM SWITCHING ARRANGEMENT

[75] Inventors: Mark T. Jeffrey; Thomas S. Maddern; Richard J. Proctor, all of Dorset, United Kingdom

[73] Assignee: GPT Limited, United Kingdom

[21] Appl. No.: 292,168

[22] Filed: Aug. 17, 1994

Related U.S. Application Data

[63] Continuation of Ser. No. 30,402, filed as PCT/GB92/01440, Aug. 3, 1992, published as WO93/03566, Feb. 18, 1993, abandoned.

[30] Foreign Application Priority Data

Aug. 2, 1991 [GB] United Kingdom .................. 9116749

[51] Int. Cl.$^6$ .................................................. H04L 12/64
[52] U.S. Cl. ........................ 370/60.1; 370/94.2; 370/63; 340/826
[58] Field of Search ............................. 370/60, 63, 94.1, 370/58.1, 60.1, 94.2, 65.5; 340/826, 825.79, 825.8

[56] References Cited

U.S. PATENT DOCUMENTS

| | | | |
|---|---|---|---|
| 4,577,312 | 3/1986 | Nash | 370/84 |
| 5,109,378 | 4/1992 | Proctor et al. | 370/60 X |
| 5,191,578 | 3/1993 | Lee | 370/63 |
| 5,307,342 | 4/1994 | Georigiou et al. | 370/58.1 |
| 5,325,356 | 6/1994 | Lyles | 370/60 |

FOREIGN PATENT DOCUMENTS

| | | | |
|---|---|---|---|
| 418813 | 3/1991 | European Pat. Off. | H04L 12/56 |
| 0458438 | 11/1991 | European Pat. Off. | H04L 12/56 |
| 2212364 | 7/1989 | United Kingdom | H04Q 11/04 |
| 2224417 | 5/1990 | United Kingdom | H04Q 11/04 |
| 2244408 | 11/1991 | United Kingdom | H04Q 11/04 |
| 2250159 | 5/1992 | United Kingdom | H04Q 11/04 |

OTHER PUBLICATIONS

Synchronous ATM Switching Fabrics, R. J. Proctor et al., Jun. 1, 1990.

Advances in Digital Circuit Switching Architecture, T. S. Maddern et al. Undated.

*Primary Examiner*—Douglas W. Olms
*Assistant Examiner*—Russell Blum
*Attorney, Agent, or Firm*—Kirschstein, et al.

[57] ABSTRACT

An ATM telecommunications switch includes a plurality of parallel data switching planes and a parallel control plane, each plane having an equal number of input ports and output ports and a central switching unit to switch each input port to any output port. A single data stream is divided between a plurality of input ports and the data is concatenated from a plurality of output ports to reconstitute the data stream. A first rotator connects each input port cyclically to each timeslot of the central switching unit and a second rotator connects each timeslot of the central switching unit cyclically to each output port.

5 Claims, 17 Drawing Sheets

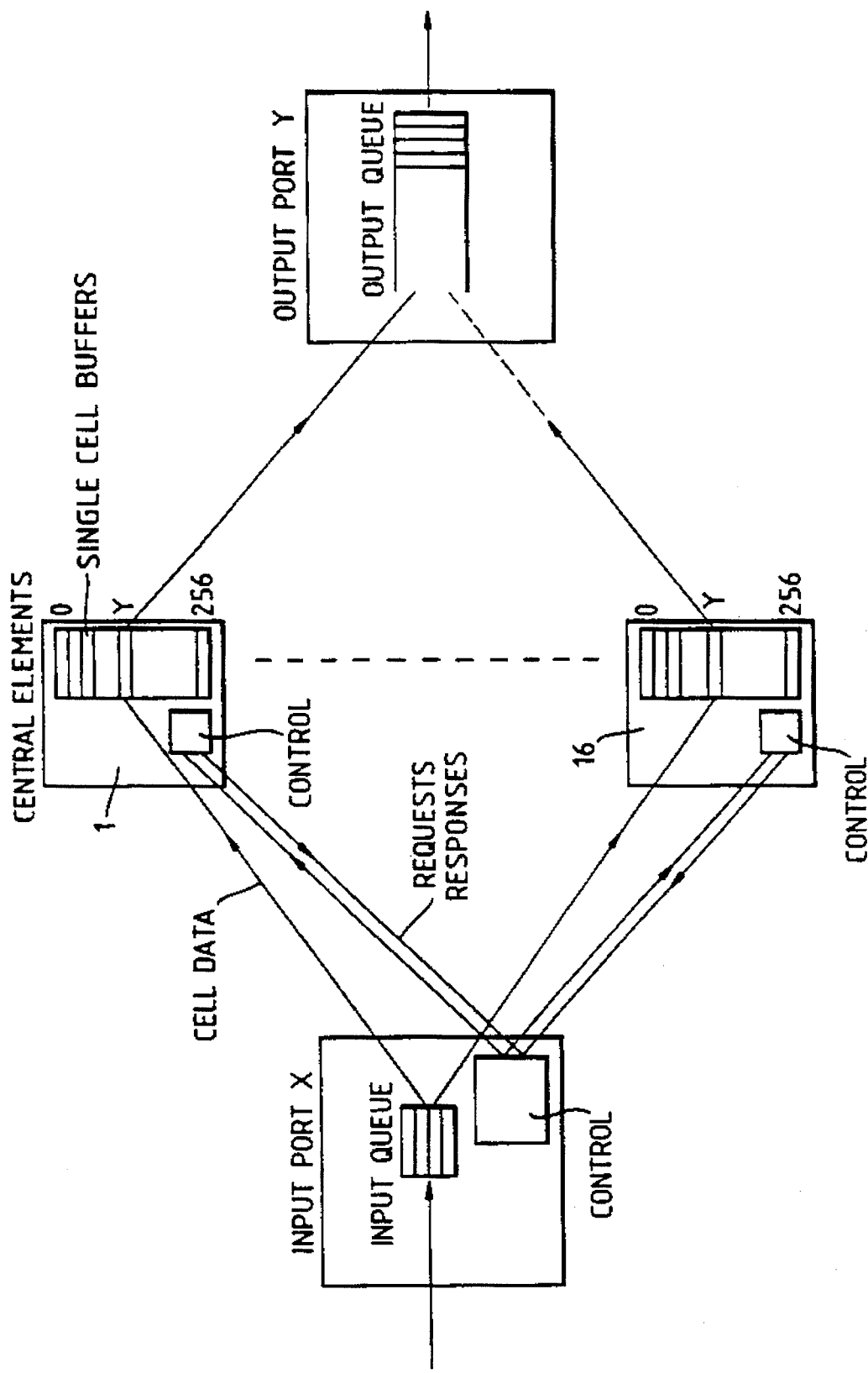

5,544,168

ATM SWITCHING ARRANGEMENT

This application is a continuation of U.S. patent application Ser. No. 08/030,402, filed as PCT/GB92/01440, Aug. 3, 1992, published as WO93/03566, Feb. 18, 1993, now abandoned.

BACKGROUND OF THE INVENTION

The present invention relates to an Asynchronous Transfer Mode (ATM) switching arrangement having a flexible design structure both as regards size and rate and capable of broadcast transmission. It is capable of being made more compact and cheaper as technology improves without the necessity of making changes in logical operation. It is basically synchronous in operation and the internal bandwidth is only twice the switched bandwidth.

BRIEF DESCRIPTION OF THE DRAWING

The present invention will now be described, by way of example, with reference to the accompanying drawings, in which:

FIG. 2 shows a conceptual view of an ATM switch according to the present invention;

Figure 1:
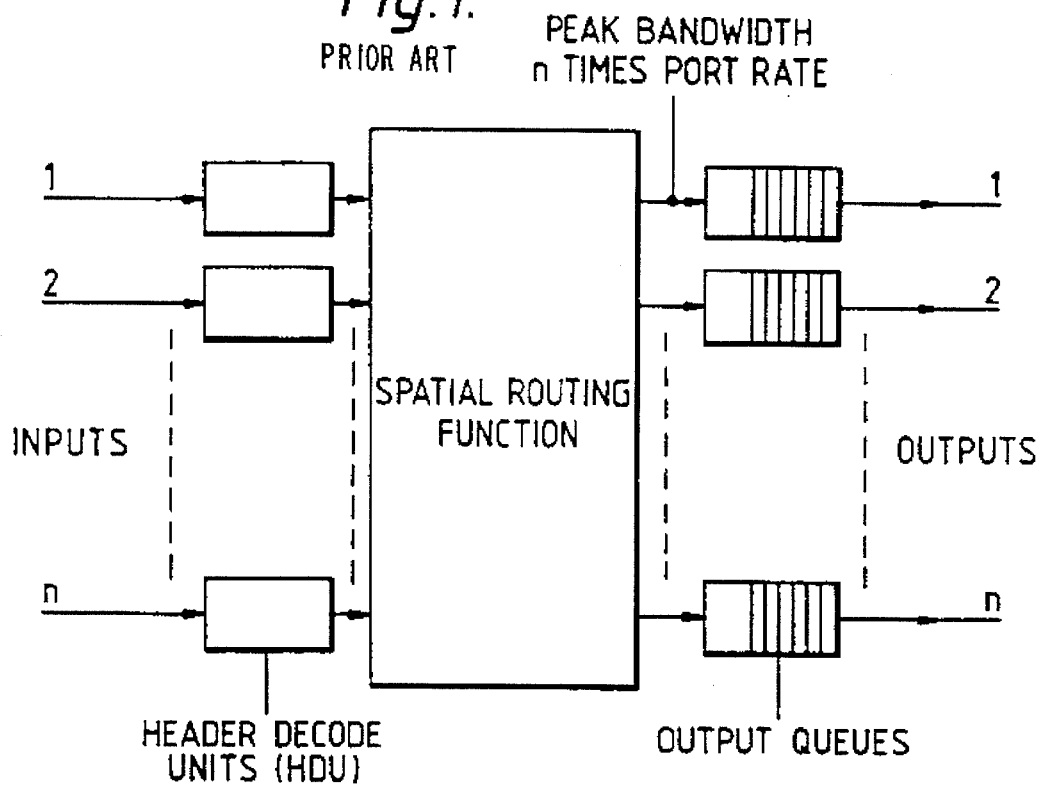
FIG. 1 shows a diagrammatic view of a known ATM switch.
Figure 3:
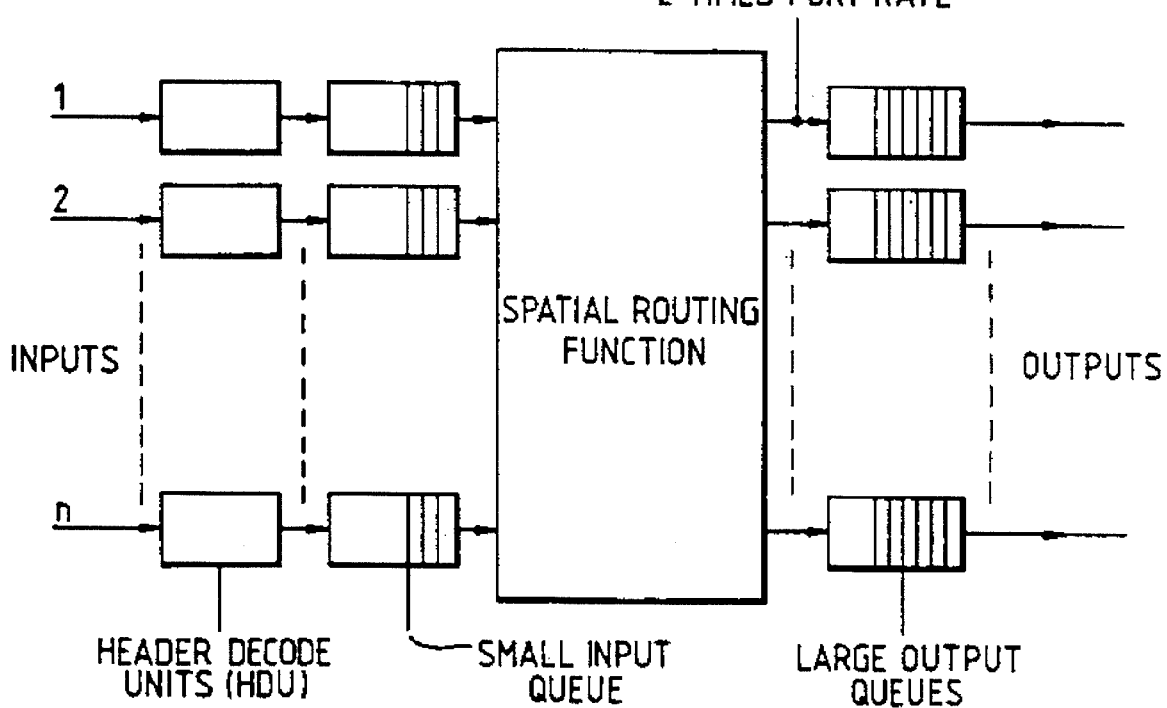
FIG. 3 shows a diagrammatic view of an ATM switch according to the present invention.

The following three definitions are used in this specification:

SUMMARY OF THE INVENTION a) Point to Point: (P:P) a connection that goes from one input port to only one output port.

Point to Multipoint: (P:MP) a connection that comes from one input port and goes to many of the output ports (possibly all).

c) Point to Few Points: (P:FP) a connection that comes from one port and goes to a maximum of three other ports.

1. INTRODUCTION

First the functions of ATM switch fabrics are considered (in Section 2). Using fast synchronus circuit switching techniques, in key areas of the design it shows how high performance switches may be implemented. The performance of this switch is compared with that of an "ideal" ATM switch, to give a true measure of the high performance obtained. This form of switch is very easy to control, manage, and maintain due to the predictive nature of its internal operation.

A three stage structure is used for the switch comprising of:

input queuing, central routing and output queuing this is a Time-Space-Time structure. Dynamic variable routing can be used across the routing stage due to the fact that a fixed delay is exhibited for all paths supporting a particular virtual connection. Use is made of the time domain to provide diversity of central routing.

The switch described has similarities to the switches described in U.K. Patent Applications Nos. GB 2224417A, GB 9019340.0, and GB 9103759.8 and in paper A6.1 "Synchronous ATM Switching Fabrics" given at ISS90 and "Advances in Digital Switching Architecture" given at 2nd IEE Conference on Telecommunications and imported herein by reference.

According to the present invention there is provided an ATM telecommunications switch comprising a plurality of parallel data switching planes and a parallel control plane, each plane having an equal number of input ports and output ports and a central switching unit to switch each input port to any output port, including means to divide a single data stream between a plurality of input ports.

Preferably the switch comprises rotator means to connect each input port cyclically to each timeslot of the central switching unit and a second rotator means to connect each timeslot of the central switching unit cyclically to each output port.

2. KEY PRINCIPLES

Before describing the detail of the switch, this section lists a few key principles.

a) The switch uses variable cell routing, finding a path across the core for each cell as it arrives. The timing across the core is a constant, this ensures that cell sequence integrity is maintained. The variable cell routing allows dynamic bandwidth changes and helps to ensure low cell loss rates.

b) The switch sends each cell in 7 parallel streams of 64 bits (7×8=56 octets), managed by a control stream.

c) The switch is entirely deterministic with the logic operating in parallel at comparatively low speeds compared with the external interfaces. This allows 600M and higher rate external interfaces to be supported without requiring 600M technology. The deterministic operation allows easy fault finding and fast changeover for 1:1 and 1:N redundant ports.

d) The switch behaves as a single stage switch (with some additional fixed delay), this gives it very low cell loss rates, low jitter, and low delay.

e) The switch behaves as a single stage output queued ATM switch. It has a central spatial routing capacity with twice the capacity of the external ports, to get cells from the input to the output queues. By applying flow control (and having small input queues) to gain access to this spatial routing very good performance can be achieved, without blocking or any cell loss.

f) The switch grows through a number of configurations from small switches of 16 ports to well over 10,000 ports. Growth from one configuration to another may be achieved without loss of existing or new calls.

g) The switch is largely technology independent. The switch can evolve and be made more cost effective as technology improves.

h) The switch can do fanout for multicast connections from the central spatial routing function to all ports.

i) The switch can handle ports of any data rate, by concatenation of ports onto the core, 150M, 600M, 2.4 G, 9.6 G . . . ports can be supported without a change to the core design.

3. SWITCHING PRINCIPLES AND REQUIREMENTS

3.1 Requirements

The following requirements apply to an ATM switch with full functionality suitable for public (or private) network development.

3.1.1 Switch Core Related Requirements a) Size from 8 to 4000 ports at 150M (or equivalent).

b) Economical over a large range of sizes.

c) Growth without service interruption and recabling.

d) No structure change for transition from 150M to 600M or 2.4 G ports.

e) Arbitrary mix of 150M, 600M and 2.4 G ports. Virtual Channels, Virtual Paths bandwidth capacity of up to 600M or more each.

g) Fan-out connections across the switch, for broadcast and multicast applications.

h) Fan-out connections within a single outgoing port, i.e. onto multiple VCS.

i) Fan-in connections for broadcast-with-feedback applications.

j) Insensitive to burst traffic and unequal loading.

k) Virtually non-blocking for all connection types, for both connection set-up and connection bandwidth change.

l) Cell loss priority based on:
CLP bit in header,
Payload Type field in header,
Virtual Path Identifier (VPI)/Virtual Channel Identifier (VCI) priority.

m) High reliability and availability.

n) Low fixed delay (tens of microseconds).

o) Low delay jitter (close to a single stage switch).

p) Low cell loss probability (less than 2E-10, at 80% load with Bernoulli distribution traffic at each input, even load distribution).

3.1.2 Control Aspects a) Dynamic change of bandwidth for existing connections without interruption.

b) Flexible handling of payload type.

c) Control throughput of at least 10 million BHCA.

d) Recovery of routing tables etc. after failure.

e) Hitless switch protection/reconfiguration (as an objective, not a requirement).

f) Provision of statistics to control software:
Cell counts on VPI:VCI
Cell loss
Policing violations
Traffic shape information
Header Error Control Field (HEC) errors—corrected
Header Error Control Field (HEC) errors—cell discarded
etc.

g) Perform all maintenance activities while carrying traffic.

3.1.3 Access Unit (Broadband) Related Requirements a) External ATM interfaces:
SDH, SONET, (VC-4, VC-4.4c, VC-4.16c, . . . ).
Plesiochronous (1.5M,2M 34M, 45M, 140M).

b) 1:1 sparing for exchange terminations; target is no switch-over time.

c) 1:N sparing for exchange terminations; target less than 20 ms switch-over.

d) 100% Failure detection capability, as a target.

3.2 Functions of an ATM Switch

The functions of an ATM switch can be broken down into three main components as shown in FIG. 1 and described below, any switch design will have one or more instance of each function:

a) A header decoder unit on each port which translates the incoming circuit identity into an outgoing circuit identity and port number. This unit is also able to police the utilsation of a particular circuit against its negotiated traffic level limits and where necessary discard cells in order to avoid overloading the switch which could impact on other traffic being carried.

b) Transfer the cells from the incoming ports to the outgoing ports according to the physical port routing information derived by the header decoder unit. This is essentially a spatial routing function.

c) Statistically multiplex the cells transferred across the routing function onto the designated outgoing port traffic stream. Due to the peaks in traffic which exceed the capacity of the outgoing stream it will be necessary to queue some of the cells. This outgoing multiplexing and queuing function may be likened to the operation of a time switch in synchronous circuit showing, but does not obey a predefined cyclic allocation of virtual circuits in the time domain.

4. EXISTING ATM SWITCH FABRICS

Before describing the operation of the current switch the ways in which existing designs implement the routing and queuing functions will be recalled.

The routing function may be implemented by a spatial routing network, much like that of circuit switch network, or use may be made of the time domain on buses or rings, such as is described in U.K. Application No. GB 9103759.8. For large switches the single point interchange media of a time multiplexed bus soon exceeds practical bandwidth limits.

The queuing function may be implemented in several ways. The most direct method is to have a dedicated FIFO type store for each output port. In practice the spatial routing function and the output queuing element cannot cope with simultaneous transfers from a large number of input ports and the output queue is reflected back onto the input ports. It is also possible to queue within the spatial routing function, particularly where it is making use of the time domain to achieve its switching operation. When the output queues are reflected back into the switch it is possible to economise by having several queues sharing one store.

Devices can be designed which perform both routing and queuing to form a mini ATM switch (such as described in U.K. Application No. GB 9019340.0), which can then be placed in a network configuration to provide large switches.

Unless the routing function is able to simultaneously carry the full load of the switch to one output, then some form of contention resolving mechanism is required or intermediate queues have to be provided. Generally ATM switches only permit virtual circuits to be routed one way internally in order to maintain sequence integrity of the cells. Similarly at the network level there is a fixed routing of cells.

Clever switch design is unable to shorten or eliminate the inherent queuing function of an ATM switch which can result in high peak delay values and even cell loss (imposed by practical queue size limits). The performance of an ATM switch design therefore should be defined in terms of its degradation of performance over the functional routing and output queuing model shown in FIG. 1.

5. PRINCIPLES OF THE PRESENT ATM SWITCH

Although some ATM switches have some similarities with synchronous circuit switches, the unpredictable traffic patterns tend to demand structures which can cope with dynamic changes. The switch of the present invention maintains very close links with synchronous circuit switches and does not fit directly into the existing families of ATM switch designs.

The switch achieves a close approximation to the functional ATM switch model. It is based primarily on the "Output Queue" architecture implied in FIG. 1.

The key aims are to minimise the "core" part of the switch to permit large sizes to be built in an efficient manner and provide optimum performance by having one stage of queuing.

The problem with standard Output Queue structures is that they require very high fan-in capacity to each output queue. One solution is to group several output queues together, with shared multiple access; the statistical gain obtained improves efficiency.

The approach taken in the switch design of the present invention is to introduce flow control to limit the capacity required of the routing mechanism. This flow control applies between input ports and core, leading to a requirement for (small) input queues as well as those at each output. The core dumps cells into the output queues on a regular basis, i.e. there is no flow control between core and output.

For large switches, excessive throughput demand would be placed on a single centralised flow control mechanism. This is avoided by employing many identical mechanisms working in parallel. An example of a 256 port switch is shown in FIG. 2, here 16 central crosspoint planes can each transfer 1 cell to each output. Each plane has access from all inputs to all outputs, and so handles its fair share of the total traffic.

At first sight it might appear that cell sequence integrity would be lost when different central stage elements are used to transfer cells on one virtual circuit. This is prevented by rotating the input and output central stage access times in step, so that there is constant storage delay in the central stage. Different input to output port combinations will have different fixed delays across the core routing function, but any two ports will always have the same delay.

Overall the design may be likened to a T-S-T circuit switch. The routing function, which does not queue cells, acts like the central space switch. The input and output queues may be equated to the time switching stages. The routing switch cannot be fixed as in circuit switching, but must be dynamic to carry the varying traffic demands, as cells arrive at the input ports.

A non-blocking three stage circuit switch requires a doubling of the traffic carrying capabilities across the central stage. This same doubling of capacity exists in this switch. In a circuit switch on path set-up it is necessary to hunt across the central switching elements to find one which has a free inlet and outlet to connect the required circuit through. This switch operates on a similar principle for routing traffic, but in this case has to hunt every time that a cell arrives at an input port.

Each input port queue has access to all the central routing elements. In turn every central routing element can launch traffic to every output port queue. Each central switch element therefore is able to carry a proportion of the full traffic load and can carry out any desired spatial routing operation. Access to and from the central elements is performed on a cyclic timing basis.

During each timing cycle every input port is able to send one cell to every central stage element. Every central stage element can hold one cell for each of the output ports in a buffer. The transfer of cells from the central elements to the output queues occurs at pre-defined times in the timing cycle. Although cells experience a storage delay in a central stage element, no queuing is possible because (for point to point traffic) only one cell is accepted from the input ports for loading into the single cell buffer for each output port.

No flow control is required between the central stage and the output queues, since there is always sufficient highway capacity to carry all the stored cells.

Once a buffer for an output port is occupied in the central switch, no other input port can use it until it has been emptied by the cell being transferred to the output port queue. The input ports are able to interrogate the status of output ports buffers that they require in the central stage elements. This request is pipelined in advance of the cell transfer to allow time for a response to be returned from the central stage. To improve the performance of the switch it is possible to request the status of more than one central stage cell buffer at a time. This has the effect of making the input queue multiple headed, but only one cell will be chosen for transfer.

5.1 Internal Flow Control Protocols

To explain the basic protocol principles, the behaviour for point to point connections will be considered first.

5.1.1 Point to Point Connections

Each port interrogates round each of the central switches in rotation, and has the capability to ask whether there is space in that central switch to send a cell to a particular destination. If there is space then central switch provides a positive acknowledgement and the port sends the cell to that central switch.

Figure 4:
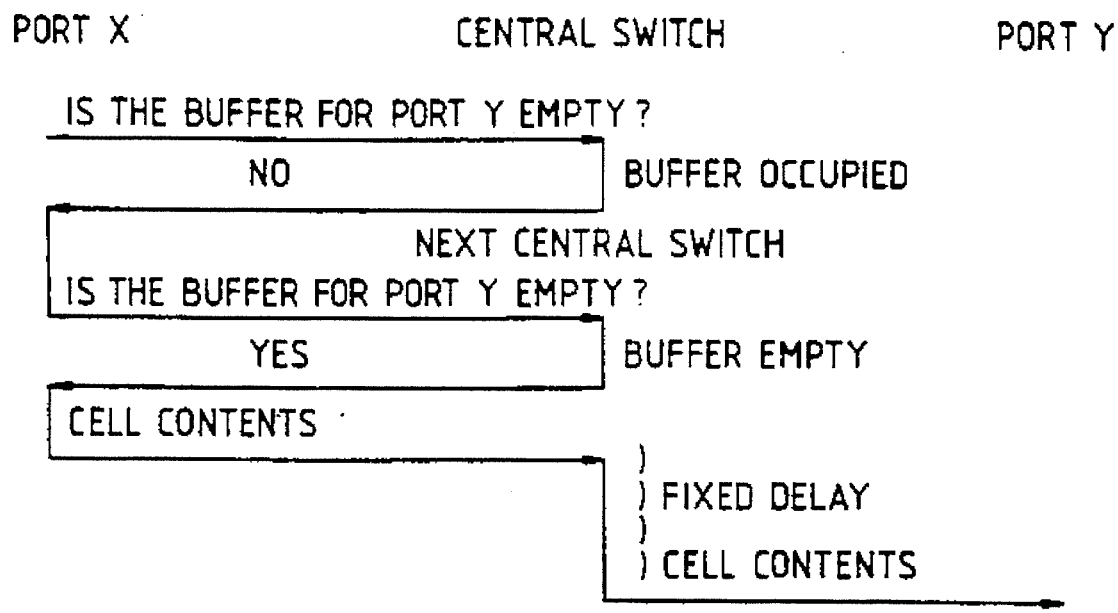
FIG. 4 shows the use of forward transfer stores for multicast operation.
Figure 5:
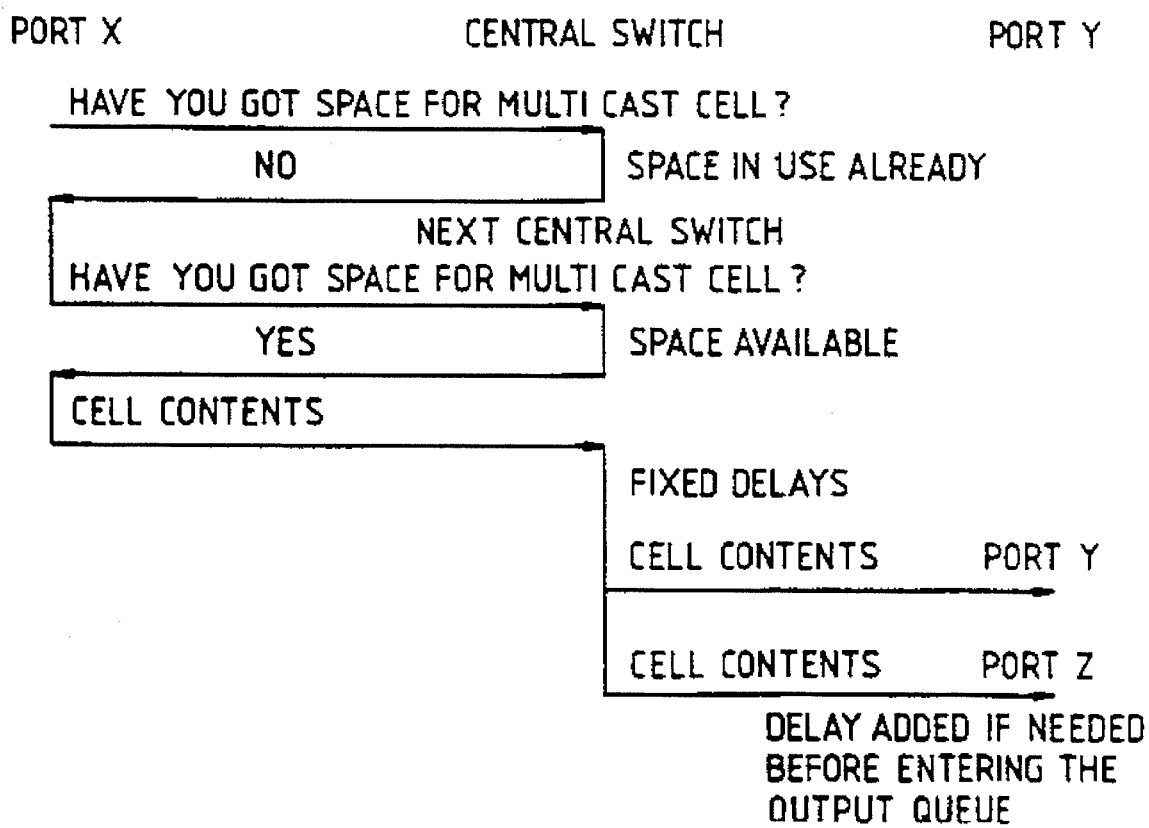
FIG. 5 shows the basic sequence of port operation for point to multipoint connections.

The data is then sent in parallel to the central stage. Subsequently the cell is transferred to the output port. The basic sequence is shown in FIG. 4.

This sequence shows the first question being blocked, and the second question being accepted. In practice a number of questions for different destinations can be asked to make the input queue multiple headed.

5.1.2 Point to Multipoint Connections

The basic sequence described above can be used for point to point connections.

However, it could also be used for point to a few points (such as 1:2 or 1:3) connections. For these cases the question could ask for two or three ports to send the one cell and the central stage then will effectively fan it out.

For point to many point applications it is unreasonable to fan out at the input port. The central switch should be used instead. The cell transfer sequence can be modified to send out multiple copies from the central switch to each output port that requires it.

One exception to this is where a connection must be fanned out to more than one VPI:VCI on a single output port. Another aspect is that multipoint connections typically require different outgoing VPI:VCI values on each port. These needs are met by providing cell replication and header retranslation in the output peripheral. How this is provided is described in the section on Peripheral Ports. These have no effect on the switch core.

There is insufficient space in a question to describe more than a very few, say three, addresses, so it is necessary to use a multipoint memory in each central stage. This records the addresses associated with a given "channel", which may coincide with a VPC or VCC, though it need not. Instead of the question being used to indicate and address, the "address" space is now used to indicate the multipoint "channel", which can be looked up in the multipoint memory.

5.1.2.1 Use of Forward Transfer stores

Figure 22A:
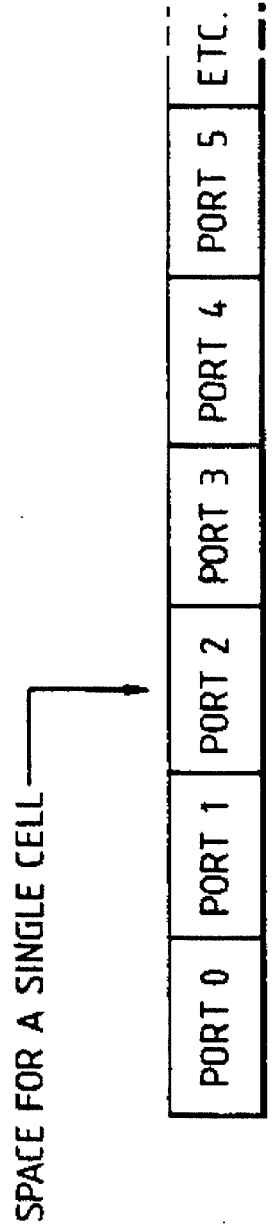
FIGS. 22a and 22b show diagramatically a forward transfer store.
Figure 22B:
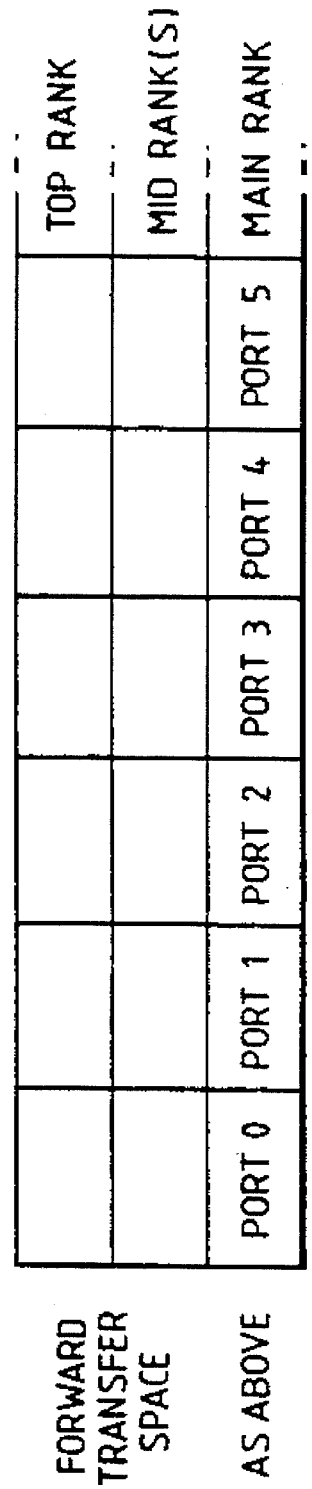

A central switching element might not have empty buffers for all the ports involved in the multicast connection. Waiting to find such a central stage may take a long time. Therefore the multicast cell is stored in a forward transfer space as shown in FIGS. 22(a) and 22(b).

For those ports where there are empty buffers in the main "rank", the cell will be transferred in the current central cycle as for a point-to-point cell. Those cells stored in the first forward transfer "rank" must wait for the following cycle of operation, while those in higher "ranks" must wait a corresponding number of cycles.

A central table is maintained in the unit to record which ranks are filled for each port, and the cell storage location that corresponds to that port/rank.

Cells are always written to the lowest available rank for the output port. Thus a single multipoint cell may be placed in the main rank for port A, in the top rank for port B, and in a middle rank f or port C.

Each rank of cells will always be "advanced" once per cycle, as cells are transferred to each output port in turn.

Point-to-point cells are not permitted to use the forward transfer facility, so they will only be accepted if the first rank is clear.

This technique can cause the multicast traffic to be out of sequence when it reaches the output port, since the first cell may be delayed up to 3 cycles while the second cell is not delayed at all. However the amount of extra delay is known and the output port can easily compensate by retiming the multi-cast cells which have not had to wait in the central switch. The overall delay will therefore remain constant. This is discussed further in the section on peripheral Ports.

The number of forward transfer "ranks" needs to be derived from simulation, but it does not complicate this method. It only needs quantifying. The delay for multicast connections will always be padded out to the set maximum number of the cycles that it could be delayed in the central stage, so the use of excessive ranks will have an adverse effect on the fixed delay component for multipoint connections.

5.1.2.2 Very Wide Fanout Connections

For some service scenarios, for example Cable Television, there will be point to multipoint connections which address most (if not all) of the output ports of the switch. "Broadcast" cells being switched in this manner have an even higher blocking probability than less wide "multiport" cells.

In order to alleviate this, one possibility is to restrict the use of the top rank of forward transfer, such that this space is only used for very wide (broadcast) connections. What constitutes "broadcast" in this context will probably have to be programmable, as different administrations and locations will have different criteria.

This technique allows a trade off between blocking for multipoint and broadcast connections, as any savings made for broadcast cause restriction for multipoint cells.

5.1.2.3 Forward Flow Control

If the top rank is reserved for broadcast cells, there is a possibility that an input port may have difficulty transferring large numbers of multipoint cells, since another port generating broadcast traffic could be hogging the capacity. We could then see the input queue start to get larger than desired for this port.

When input queue reaches a programmed length, the input port could set a "forward flow control" bit in the "question" asked. This bit would tell the central stage to treat the multipoint cell as a broadcast cell, allowing it access to the "top rank" of forward transfer storage.

5.1.2.4 Delay Economy

If the top rank is restricted to broadcast cells, there is no need to consider this delay in the retiming of multipoint cells. This gives less wide multipoint cells a better delay performance, and reduces the capacity needed in the retiming device.

Of course, if Forward Flow Control is employed (to permit multipoint cells to access the top rank), this economy cannot be made.

5.1.2.5 Point to Few Points

As stated above, traffic on 1:2 or 1:3 connections can be switched without having to set up multipoint tables in the switch core, and can operate solely in the "main rank", as for point to point cells.

However, it is perfectly possible to enable the use of forward transfer for these cells as well, to reduce their blocking probability. It is doubtful whether this is worthwhile on large switches, as they have a high probability of being accepted anyway, but it may be worth providing on small (16,32 port) switches where blocking is more likely.

5.1.3 Protocol Summary

Point to point connections are sent from the input to the output port via a flow controlled central stage with a fixed delay;

Point to Multipoint Connections are fanned out in a central stage and take a small number of discrete delays, which can be easily re-sequenced at the output port;

Point to Few Point Connections can be sent from the input to the output ports via a flow controlled central stage, where they are fanned out. These have a fixed delay, the same as the point to point traffic.

5.2 Basic concept of a central switch

Figure 6:
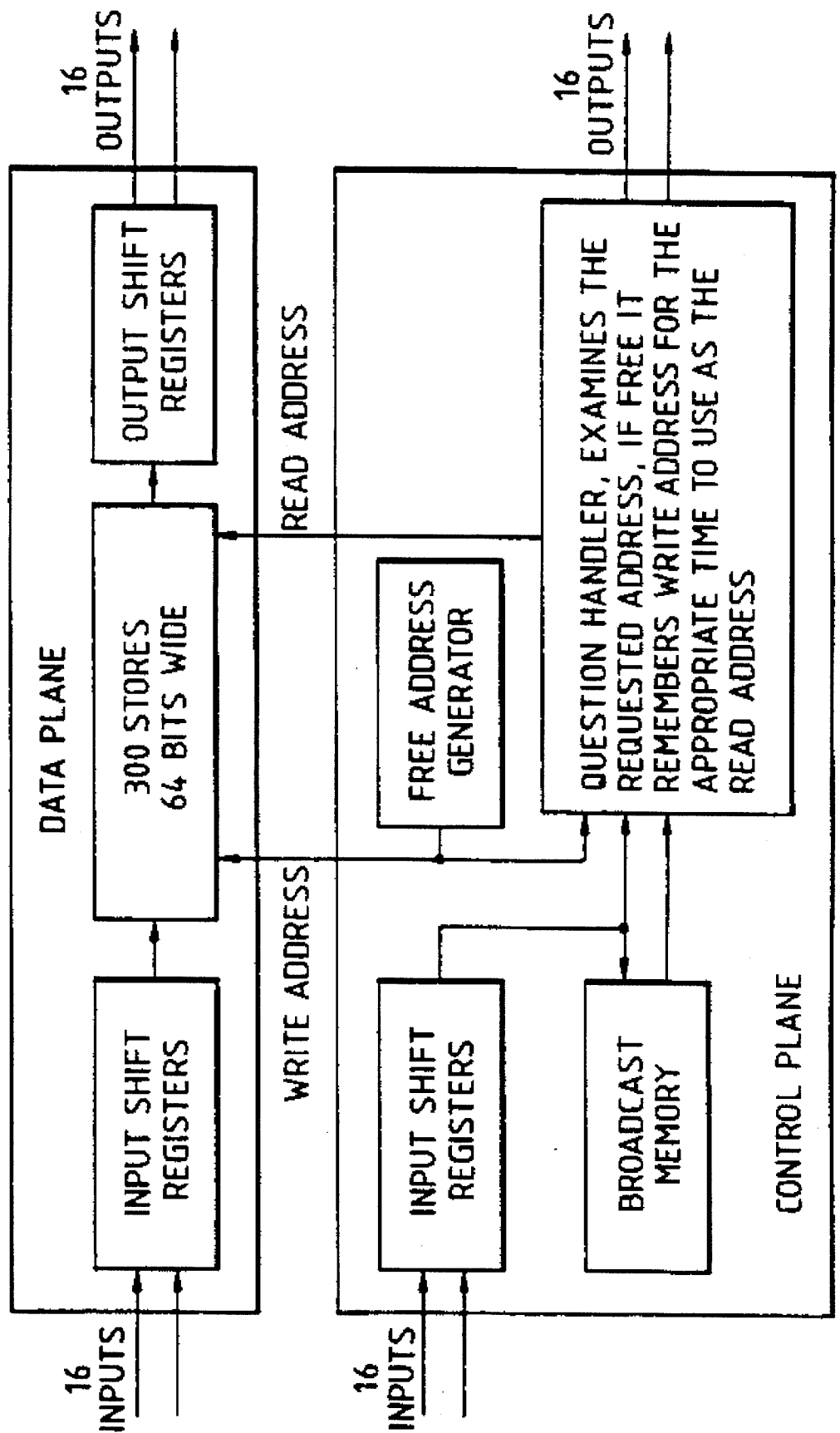
FIG. 6 shows a diagrammatic view of a data plane of a switch according to the present invention.

To explain the operation of the central switch in more detail the behaviour of the control and a data plane will be examined. There are seven data planes but they all do the same thing, so only one is shown in FIG. 6.

In the data plane, the 16 inputs and outputs are staggered in time. Every 4 clock periods one of the 16 input 64 bit shift registers becomes full and the 64 bits are written to the cell store, every 4 clock periods one output register is empty and is loaded with 64 bits from the cell store. The read and write accesses are interleaved, for simplicity.

In the control plane, the requests are also staggered in time, so that only one need be auctioned at once. These are read in serially from the 16 inputs, and then handled by the question answering function. This looks to see if the requested output buffer is free, and if so answers appropriately to the request. The question handler then stores the address generated by the free address generator until the appropriate point in time when it is used as a read address in the data plane.

For multicast requests the broadcast memory is accessed to determine which addresses the cell is for.

6. LOGICAL DESIGN

The logical architecture will now be discussed in some detail.

The main logical data rate that is used between Application Specific Integrated Circuits (ASICs) is 41.472M, this is the rate at which data has to pass between functions, it can be multiplexed up to higher rates, or sent in parallel at lower rates.

Consideration had been given to using a rate of 38.88M for 1024 ports, but this switch now uses 41.472M. This data rate allows much smoother growth for small sizes, due to the greater number of factors. It also locks the internal cycle to SDH rows, which makes framing easier. The switch now requires much less IO per device and per card, and grows through four major configurations to much larger sizes than previously allowed.

The rate of 41.472M is 4/15ths of the SDH line rate of 155.52M.

6.1 Logical Structure

Before considering the physical realisation, the logical realisation must be covered.

The basic description here is about the 256 port switch, larger and smaller versions can be made and will be explained later. This also relates to 150M ATM ports, higher rate ports will be explained later on.

Figure 7:
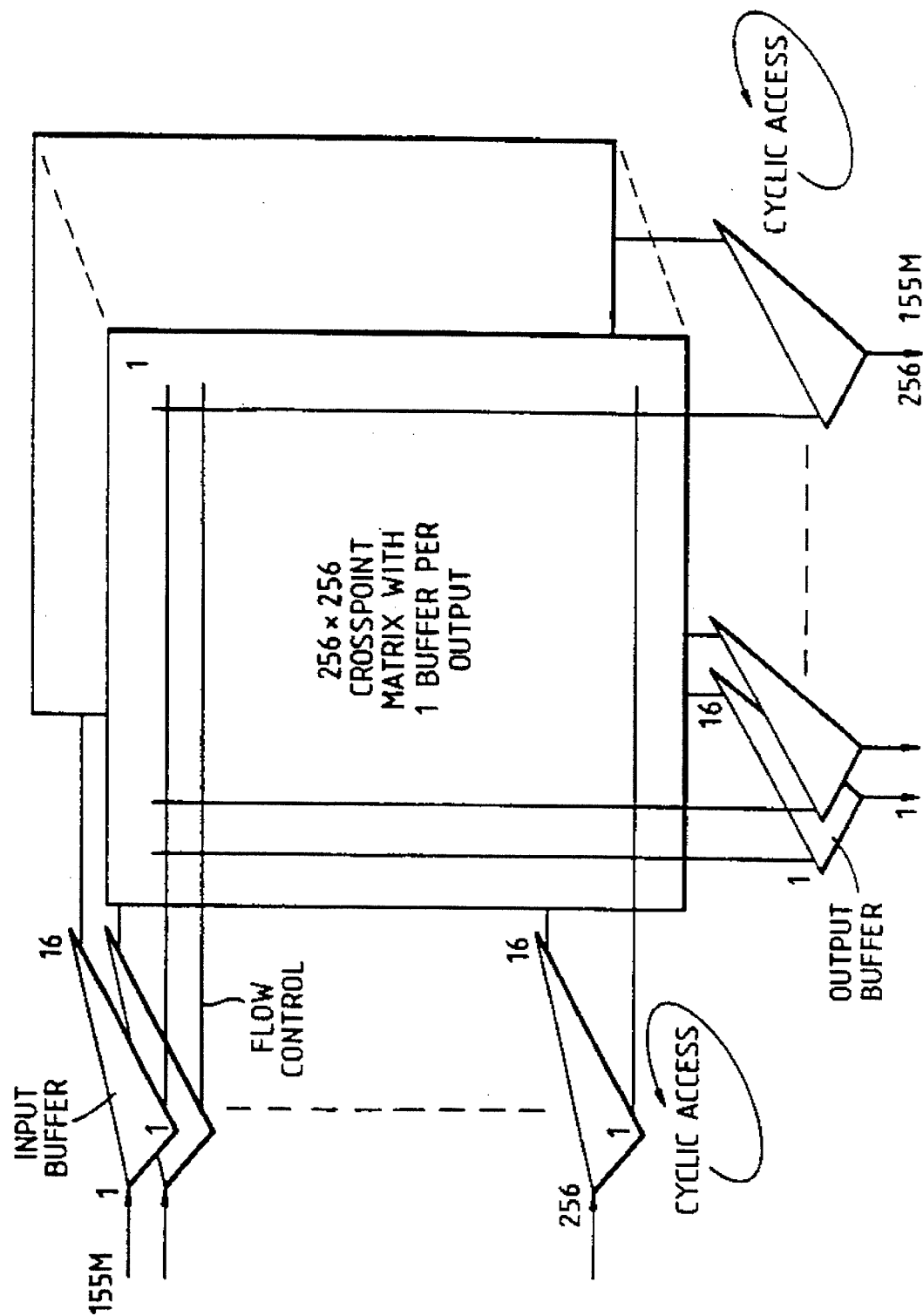
FIG. 7 shows a conceptual view of an ATM switch according to the present invention.

The switch has 16 central planes each of which acts as a 256×256 crosspoint matrix. Each input port distributes its load over these planes in a cyclic manner. Each output port collects cells from these planes in the same cyclic manner and then queues the cells for transmission to the output port. See FIG. 7.

The cyclic access ensures the delay is always constant, as all the central planes operate the same sequence. The operation of the central stages is staggered so that they can be accessed in sequence.

Higher bandwidth ports must interface to multiple ports on this core switch, for instance 600M would use 4 ports, 2.4 G would use 16 ports and so on. Provided that the logic can operate fast enough at the input ports buffer, there is no reason that this method could not be extended indefinitely to match the future evolution of the ATM standards.

Figure 8:
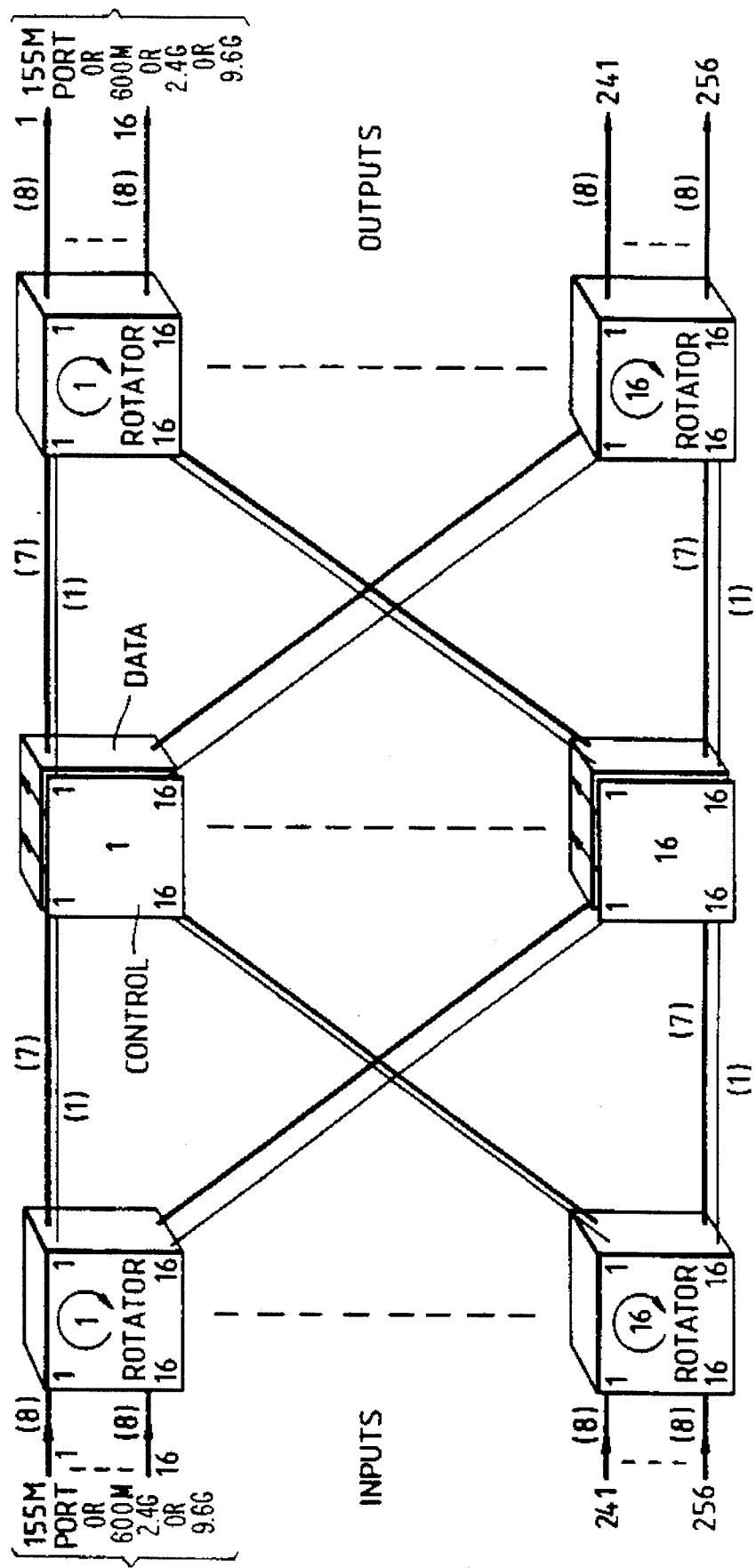
FIG. 8 shows a diagrammatic view of the core of the switch of FIG. 7.

FIG. 8 illustrates the way in which the core operates. The whole core operates on 8 parallel planes: one for control and 7 for cell transfer. All the logical links operate at a logical 41M (this could be 1×41M, 2×20M or 4×10M if required by technology).

Each 155M port will result in 8 links to rotator functions, 1 for control and 7 data links. Each of the 8 rotator functions has 18 inputs and rotates these over the 18 outputs over a cycle of 16 timeslots, each of 64 bits. The 7 data links of 64 bits is equivalent to 56 Octets, more than enough to hold the 53 octets of a cell.

The input rotator cycles round the central switches, each of these has 18 inputs and 16 outputs, and due to the cyclic nature of these it has one access to each input port each cycle. The central control stage answers the questions from the ports to control the operation of the 7 central data switches.

To allow for the questions to be asked before the data is sent, the control plane has to operate slightly differently from the data planes. For the input port's control to be able to ask questions in advance of the data part of the control plane has to operate in advance of the data planes. Additionally for the input port to be able to qualify the actual data sent it is necessary to send some control information at the same time as the data. To resolve these, the control cycle is split into a period of 48 bits (for asking the questions) that is two timeslots ahead of the data, then a gap of 64 bits (one timeslot) to allow for the questions to reach the central switch and the answer to return, followed by a control period of 16 bits at the same time as the data, to qualify it. These control periods are multiplexed together in one stream as shown in the table below.

| DATA PLANES | | | | | | | |
|---|---|---|---|---|---|---|---|
| Data TS0 | | Data TS1 | | Data TS2 | | Data TS3 | |
| CONTROL PLANE | | | | | | | |
| Qual0 (16) | Quest2 (48) | Qual1 (16) | Quest3 (48) | Qual2 (16) | Quest4 (48) | Qual3 (16) | Quest (48) |

"Data TS2" is the data in timeslot 2, which had questions asked two timeslots in advance at "Quest2" and the data is qualified with the field "Qual2" at the same time as it is sent.

By rotating the input and output together the delay across the central switch is a constant for any given connection. The values of this constant delay depend on the relative positions of the input and output ports on the timing cycle. The loop delay (time from A to B plus the time from B to A) is exactly 1 cycle (28 microseconds).

6.2 High rate peripheral ports (600M, 2.4 G)

The basic design so far has described the use of the switch core for 150M ATM ports. For higher rate ATM port interfaces, several links to the core are used under the management of the input port. In principle this design can cater for ports of any bandwidth.

To operate at higher rates the main changes would be at the periphery of the switch to have high rate ports which feed multiple links to the switch core. The switch core needs to be configured slightly differently for the high rate ports, though changing the configuration for the high rate ports does not affect the operation for existing lower rate traffic. The core configuration changes are very small and can be allowed for in the implementation for 155M interfaces. The change in the core is the same for any higher rate, it just affects more of it.

There are no restrictions on making connections between different rate ports.

6.2.1 Principles

It is essential that high rate ports can handle high rate connections, i.e. greater than 155M. This implies that there must only be one queue of cells, in the ports.

Ports should operate with the same protocols whether they are sending cells to low rate or high rate ports.

It is regarded as desirable to connect all the links of a high rate port to a single Rotator, thus permitting easy cable management, and allowing these links to make use of higher rate internal transmission rates when technology allows. Ports greater than 2.4 G (a whole Rotator), will be connected to a number of adjacent Rotators.

The principles that follow basically give access to a single high rate port many times a cycle, it does not treat it as a number of lower rate ports.

The description that follows, uses a 600M port as an example, but similar actions apply for any rate. In accessing the central stages, it is not possible to ensure constant delay, and non blocking operation at the same time. However by having a small number of known delays, and using at the high rate ports a similar resequencing as that required for multicast traffic, then the full load of traffic can be handled without any restrictions. The retiming will involve a 0,1,2 or 3 timeslot retime for 600M traffic, the full load of traffic can be handled without any restrictions.

Each central stage does not have one buffer for a 600M output, but 4 buffers that correspond to different timeslots. Traffic is always placed in the first available free one. As the timeslots are adjacent (what ever the rate), this is simple to organise by passing two signals (one for point to point and one for point to multipoint) between adjacent question answering functions in the centre.

The high rate port then has to retime the groups of 4 timeslots, by delaying the first timeslot by 3 timeslots, the second by 2 and the third by 1 timeslot. The four cells are then used in the same order as they arrive in.

6.2.2 High Rate Interface Ports

A high rate port has to manage multiple links to the centre of the switch from a single queue of cells. To do this it has several sets of questions outstanding to different central stages, and has to co-ordinate them.

Other than working faster to handle multiple links, it must ensure that it asks different questions to different central stages if possible, so that it does not have too many outstanding questions for the same port compared with the number of cells for that output port. Note that this would work for 150M ports as well, but is not necessary.

For 600M ports, the port would handle 4 separate links to the switch core, these will be exactly one timeslot apart in phase, but are aligned at the timeslot level (due to the fact that they use a common Rotator). Likewise a 2.4 G port would handle 16 links that are each one timeslot apart in phase. A 9.6 G port however would have sets of links, with each set having 18 equally spaced timeslots, but the sets would be offset in time by 4 bits.

7. PHYSICAL DESIGN

The design is based around the logical structure, described in the previous section. This design is built around the following assumptions for technology, later in the section it is explained how it can be compacted with enhanced technology.

| PROPERTY | ASSUMPTION |
| --- | --- |
| Logical internal data rates between ASICs | 49.152M |
| 1st implementation data rates between cards | 8 × 49M = 393M |
| Max IO optical ports per card | 32 at 393M |

The design will be described in terms of a implementation technology with card level interconnect at 165M. This can be scaled to many levels of technology, both simpler and more advanced than this level.

The basic description covers the switch for 288 ports, the next section covers how it is scaled to much larger or smaller switches.

7.1 Physical Structure Using 393M Technology

Figure 9:
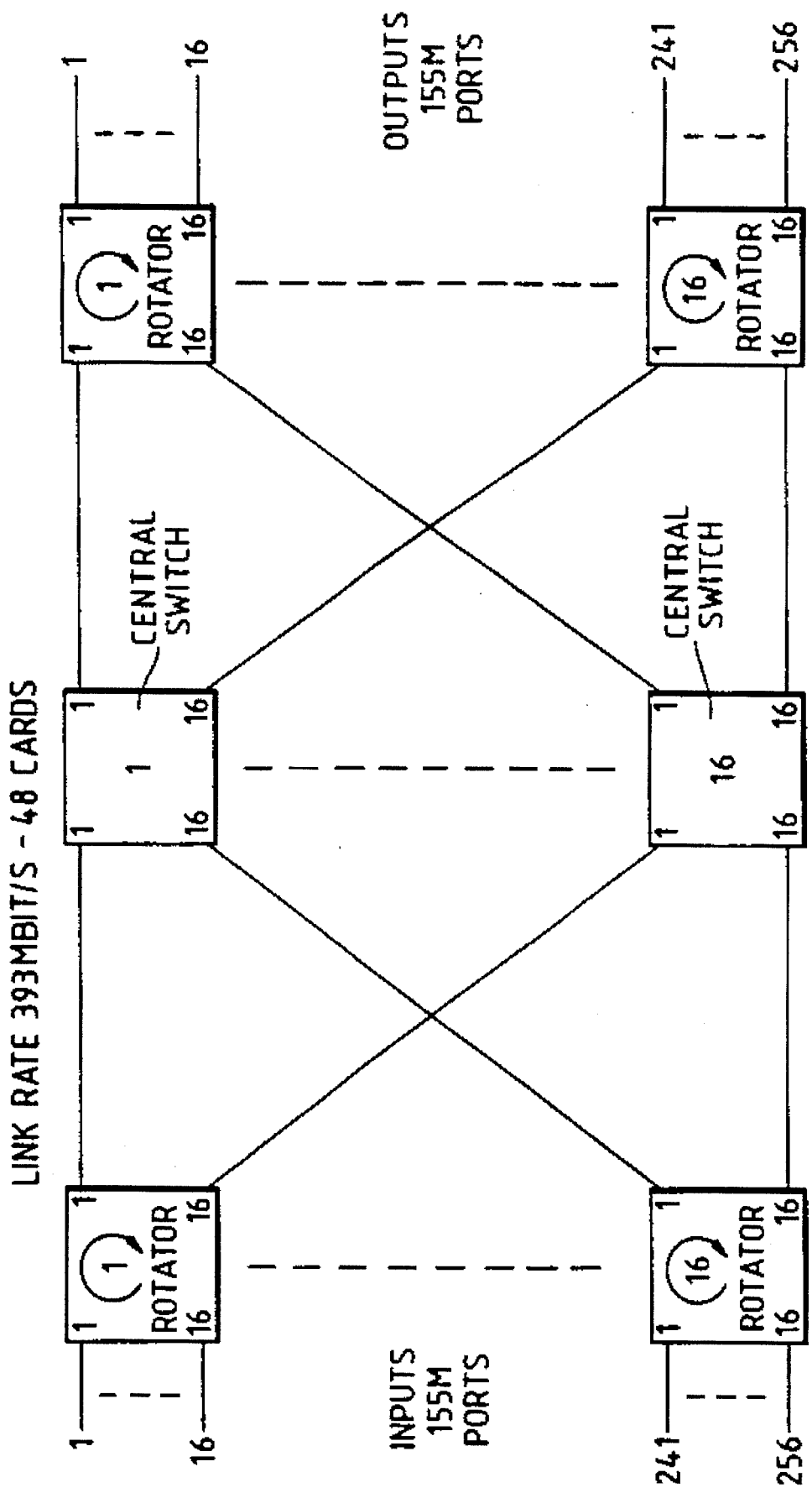
FIG. 9 shows a diagrammatic representation of the physical structure of a switch using 165M technology.

Mapping this logical structure into a physical realisation that uses 393M links between cards is shown in FIG. 9. There are pairs of input Rotators, output Rotators and central switch cards. Each of the Rotator cards carries 8 of the 49M links to or from each port. One of the central switch cards has the control and 3 data planes, the other has 4 data planes.

The internal logical data rate of 49M is only one possible figure, in practise (for ATM) it would be acceptable to operate at a lower data rate.

These Rotators and central switches are mounted together to form the switch core. At full size (16+16+16)=48 cards are required, however technological enhancement can reduce this number significantly see Section 6.

The central switch control plane could be conceived as a single ASIC but it is beyond the scope of present technology when handling multicast connections. Therefore it will be shown here as two types, one (The Central Port Control) that is replicated to manage each of the 16 outputs and one Central Memory Manager that is the comon part of the control.

If the broadcast memory is integrated then the control plane exceeds what can be provided in one ASIC using present day technology, if external it would require too wide a highway for a practical implementation. The solution adopted, integrates the broadcast memory, but divides up the function into manageable units.

8. GROWTH

This section describes the logical growth stages and describes the principles of the different stages. The details of implementation are in the implementation sections later.

8.1 Growth stages

Figure 10A:
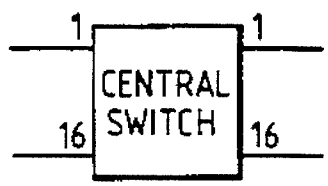
FIGS. 10a, 10b and 10c show examples of switch configurations for use in the switch of FIG. 7.
Figure 10B:
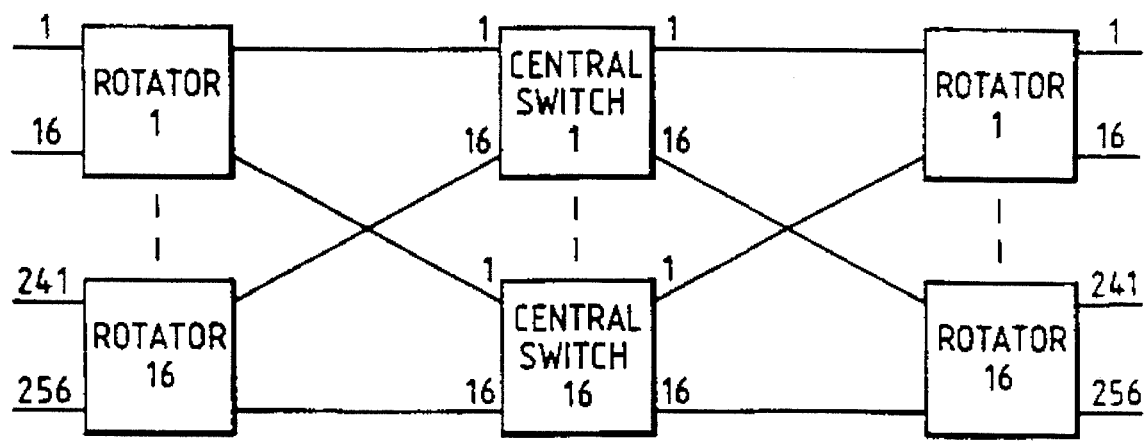
Figure 10C:
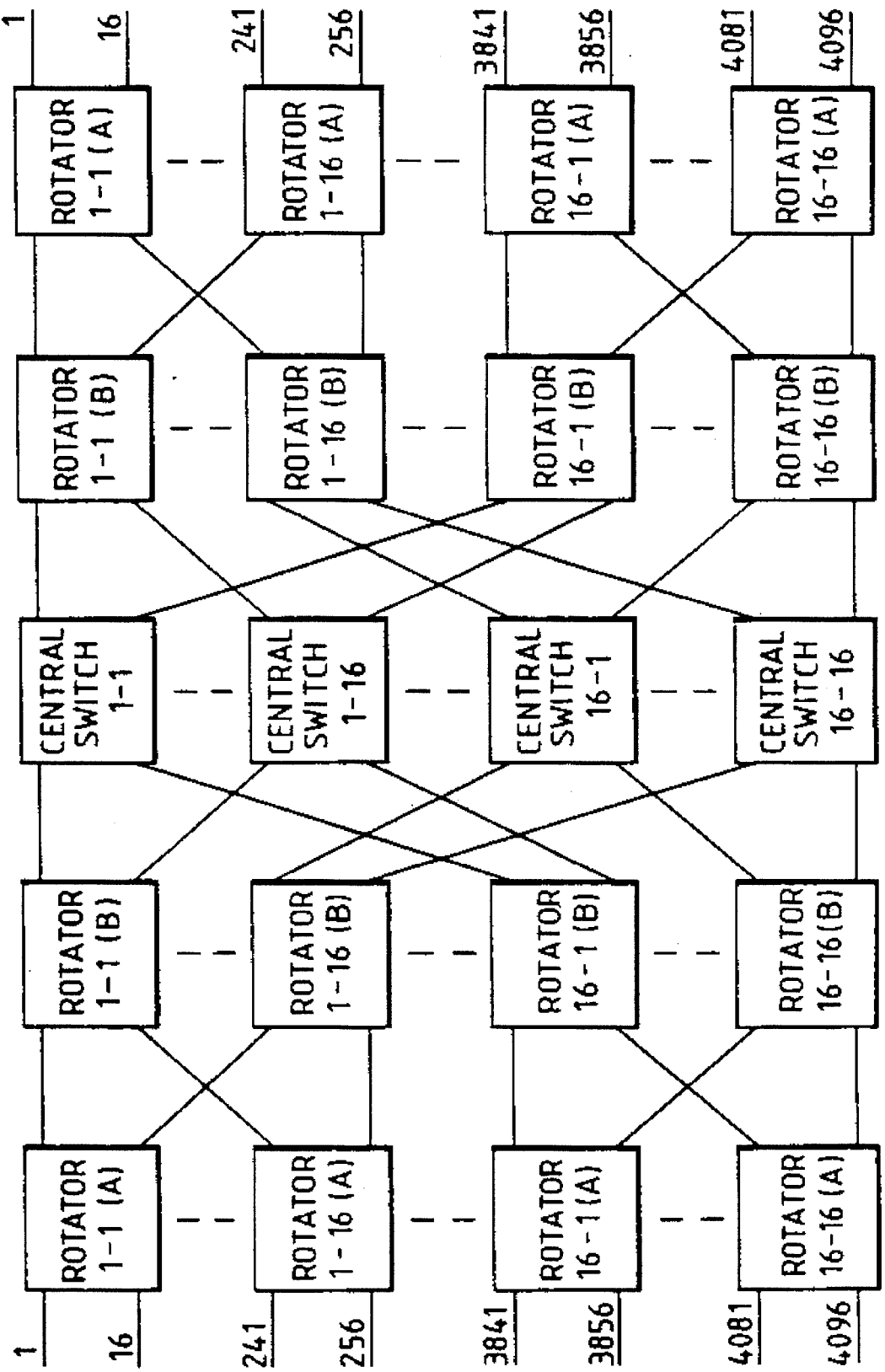

The switch grows through four major configurations, depending on the depth of rotation provided and the configuration of the central switches. FIGS. 10a–10c show the principles of the first three configuration types, the enormous version is the same as the large in structure but has more than 16 inputs to each central switch. The configurations are

8.1.1 Simple Switches

A simple 16 port switch as shown in FIG. 10a does not need the rotator function to spread the load, 16 ports can be connected to one central switch. If desired, this could be simplified for this application to make it more cost effective, but this would limit the capability to grow to the larger sizes.

8.1.2 Main Switches

A growth up to 256 ports (16×16) is shown in FIG. 10b using one stage of Rotators and 16 single central switches. There are sensible growth options that are more economical to smaller sizes of 128, 64 and 32 ports. Most of the description of this configuration will be on the full 256 port size. The switch is optimised for this size range.

8.1.3 Large Switches

A large growth to 4096 ports (16×256) is shown in FIG. 10c. This should be considered as an N×256 port switch, where the delay grows with N, this uses two stage Rotators to give a wider fanout to 16N central switches.

Each central stage still has only 16 ports. To make the central stages run for longer periods, multiple central stages can be joined together to make one larger with a longer cycle time.

Figure 11:
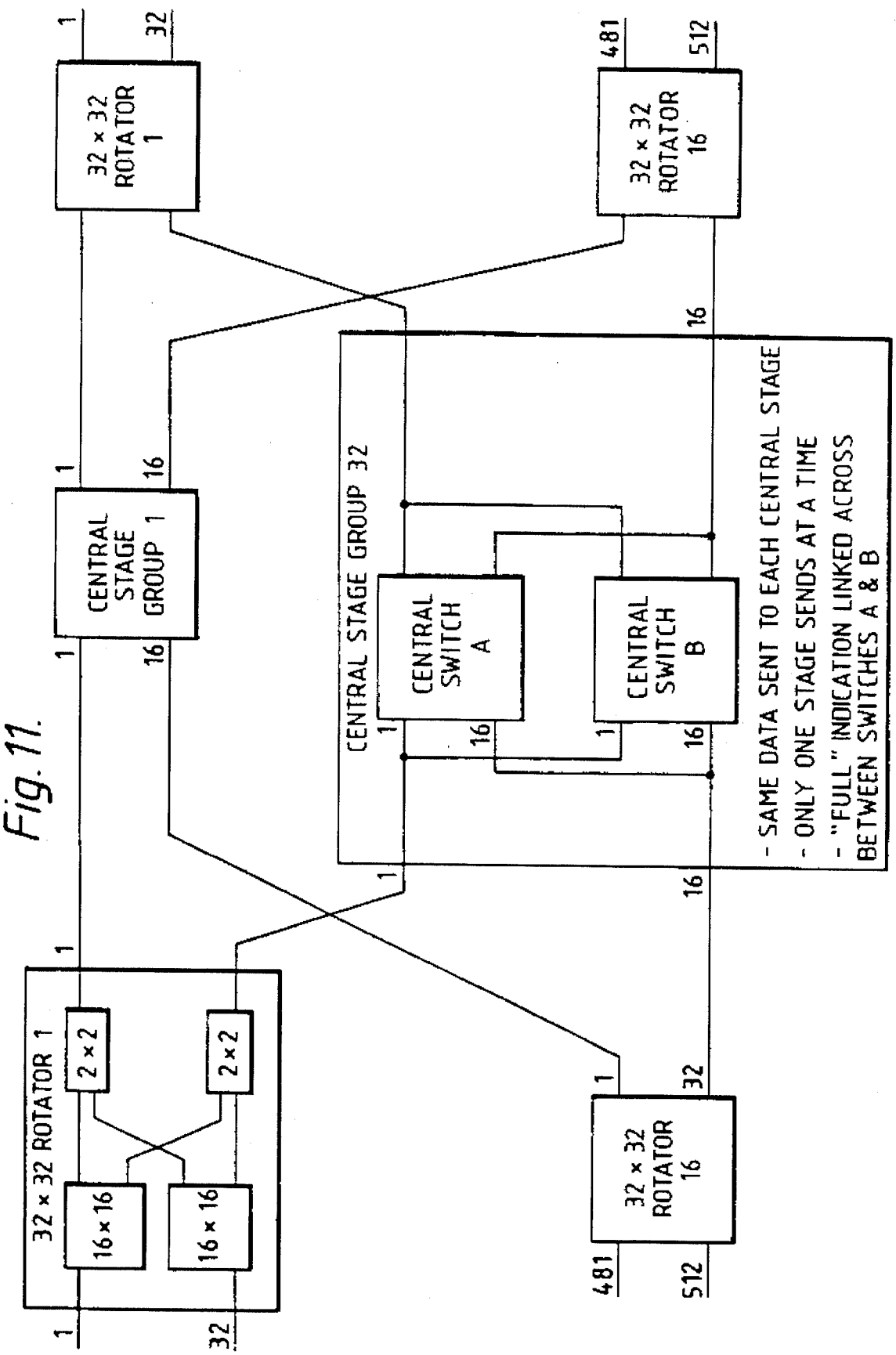
FIG. 11 shows a diagrammatic view of a further switch configuration.

This type of configuration is appropriate for small values of N, and is cheaper for small values of N than the next version. There are sensible growth options to 512 (N=2), 1024 (N=4), 2048 (N=8), and 4096 (N-16) ports, other intermediate steps can also be made. The description of this type will concentrate on the 1024 port size as shown in FIG. 11.

8.1.4 Enormous Switches

An enormous growth that could in the extreme handle 65356 ports is possible.

The enormous architecture grows the number of inputs and outputs from each central switch. This allows the switch to grow in size without increasing the delay. However this can not be simply done by sticking central stages together as for the large switches.

This uses two Rotator stages, to give a wider fanout and glues a number of central stages together for very large switches. For each factor of four increase in size, there is a factor of two increase in delay, and a factor of two increase in the size of central stages. It would be possible to combine this type of growth with the previous type for reasons of economy. The central switch has a square growth for this type of configuration, but requires additional glue logic to manage the control plane complexities due to simultaneous requests. Due to interconnect problems, these growth stages are easier if larger central stages are made from larger devices.

In the control plane it is necessary to look at all streams before answering questions. This has to be done serially to ensure that only one request for a given output is accepted. It might be possible to have twice as many ports i.e. 32 ports in a single controller, but beyond this it requires an additional level of sequencing to manage multiple requests at the same time. For the details see the next section and FIG. 12.

Each central stage group is the same as the central stage for large switches. The ordering and selection sorts requests on the same timing phase so that only one request is sent to each central group and each group corresponds with 16 outputs from the central stage. The additional control for the data planes is for selectors on the input in the same way as the selection works in the control plane.

This configuration can be used with large Rotators to build efficient switches without the delay penalty of using only Rotators.

There are sensible growth options to intermediate sizes of 512, 1024, 2048, 4096, ... ports. There are other options as well that do not use the rotators as efficiently.

Most of the detailed description about this configuration will be on the 4096 port size, this uses the rotators as a 64 way rotator (16×4) and each central stage is a 4×4 matrix.

8.2 Growth Parameters

There are several parameters that can be adjusted to make smaller switches which allow efficient growth. The interconnection of the rotators and central switches is the key factor. Those arrangements that grow to the largest size without recabling do not use the equipment as efficiently at small sizes as those arrangements that are not intended to grow as large. The variables that can be used are Number of slots in a cycle from 16 to (8, 4, 2 or 1) which reduces the number of central stages to match. When there are only 8 slots in a cycle, the 16 input Rotator can act as a pair of 8 input Rotators.

b) The number of central stages can be reduced without a corresponding decrease in the number of timeslots in a cycle. This is useful at small sizes to maintain central route diversity with a small number of central stages. Each central stage will then operate as a number of virtual stages.

c) Sub-equipping the Rotators for the smaller sizes and only partially using the ports on the Rotators on configurations that grow to the largest sizes.

d) Although a 16 input central stage could be used as a pair of 8 input central stages, for control purposes it is much easier, to have less central stages and less slots in a cycle, than to have keep 16 smaller central stages.

By changing the number of slots in a cycle from 16 to (8, 4, 2, or 1) much smaller switches can be built that still grow to the full size without recabling or card changes. However this under-utilises the capability of the equipment in the smaller sizes. A more efficient way of growth can be achieved by changing the cabling between the Rotators and central switches as it grows. Further variations can be achieved by adjusting the number of central stages and/or the number of Rotators for that basic configuration. The following tables (below) should give a better explanation and show the growth options.

Those configurations shown with only 1, 2 or 3 central switches suffer from a lack of route diversity and show input queue growth, with less than 2 timeslots. For such configurations 2 timeslots are always used. This has the effect of maintaining the fixed delay component for these small sizes, but it it still smaller than the larger sizes.

Similar principles exist for the large switches building larger and larger Rotators and central stages out of the basic building blocks.

This switch can be configured with a varying number of central stages and Rotators. The number of ports the switch supports for each configuration is shown as the entry in the table. The choice of configuration for a size and the progressive growth route depends on the cost of the cards.

8.3 Details of growth stages 8.3.1 No Rotator configuration

The basic no Rotator configuration has a single central switch to handle 16 ports, but this would be a bit large physically. However by simply relaying out the functions this can be reduced to a card. By reintegrating this could be reduced to a single fully compatible ASIC.

8.3.2 One level Rotator configurations

It is possible by recabling to move from the no Rotator configuration to these configurations.

There are many other options other than those listed here.

8.3.2.1 256 Port Maximum Switch Options

There is one link from each rotator to each central switch.

| Central Switches | 1 | 2 | 4 | 8 | 16 |
|---|---|---|---|---|---|
| Timeslots in cycle | 2 | 2 | 4 | 8 | 16 |
| Rotators | | | | | |
| 1 | 1 | 2 | 4 | 8 | 16 |
| 2 | 2 | 4 | 8 | 16 | 32 |
| 4 | 4 | 8 | 16 | 32 | 64 |
| 8 | 8 | 16 | 32 | 64 | 128 |
| 16 | 16 | 32 | 64 | 128 | 256 |

8.3.2.2 128 Port Maximum Switch Options

There are two links from each Rotator to each central switch.

| Central Switches | 1 | 2 | 4 | 8 |
|---|---|---|---|---|
| Timeslots in cycle | 2 | 2 | 4 | 8 |
| Rotators | | | | |
| 1 | 2 | 4 | 8 | 16 |
| 2 | 4 | 8 | 16 | 32 |
| 4 | 8 | 16 | 32 | 64 |
| 8 | 16 | 32 | 64 | 128 |

8.3.2.3 64 Port Maximum Switch Options

There are four links from each Rotator to each central switch.

| Central Switches | 1 | 2 | 4 |
|---|---|---|---|
| Timeslots in cycle | 2 | 2 | 4 |
| Rotators | | | |
| 1 | 4 | 8 | 16 |
| 2 | 8 | 16 | 32 |
| 4 | 16 | 32 | 64 |

8.3.2.4 32 Port Maximum Switch Options

There are eight links from each Rotator to each central switch.

| Central Switches | 1 | 2 |
|---|---|---|
| Timeslots in cycle | 3 | 3 |

| Rotators | | |
|---|---|---|
| 1 | 8 | 16 |
| 2 | 16 | 32 |

8.3.3 Two level Rotator configurations

| Size | A | B | C | D | E | F | G |
|---|---|---|---|---|---|---|---|
| 1024 | 32 | 32 × 32 | 16 × 16 | 2 × 2 | 2 | 32 | 32 |
| 2048 | 32 | 64 × 64 | 16 × 16 | 4 × 4 | 4 | 64 | 32 |
| 2048 | 64 | 32 × 32 | 16 × 16 | 2 × 2 | 2 | 32 | 64 |
| 4096 | 32 | 128 × 128 | 16 × 16 | 8 × 8 | 8 | 128 | 32 |
| 4096 | 64 | 64 × 64 | 16 × 16 | 4 × 4 | 4 | 64 | 64 |
| 4096 | 128 | 32 × 32 | 16 × 16 | 2 × 2 | 2 | 32 | 128 |
| 8192 | 32 | 256 × 256 | 16 × 16 | 16 × 16 | 16 | 256 | 32 |
| 8192 | 64 | 128 × 128 | 16 × 16 | 8 × 8 | 8 | 128 | 64 |
| 8192 | 128 | 64 × 64 | 16 × 16 | 4 × 4 | 4 | 64 | 128 |
| 8192 | 256 | 32 × 32 | 16 × 16 | 2 × 2 | 2 | 32 | 256 |
| 16384 | 64 | 256 × 256 | 16 × 16 | 16 × 16 | 16 | 256 | 64 |
| 16384 | 128 | 128 × 128 | 16 × 16 | 8 × 8 | 8 | 128 | 128 |
| 16384 | 256 | 64 × 64 | 16 × 16 | 4 × 4 | 4 | 64 | 256 |
| 32768 | 128 | 256 × 256 | 16 × 16 | 16 × 16 | 16 | 256 | 128 |
| 32768 | 256 | 128 × 128 | 16 × 16 | 8 × 8 | 8 | 128 | 256 |
| 65536 | 256 | 256 × 256 | 16 × 16 | 16 × 16 | 16 | 256 | 256 |

Key to Table
A = Number of Rotators
B = Overall Rotator Configuration
C = First Rotator Configuration
D = Second Rotator Configuration
E = Depth of each Central Switch
F = Number of Central Switches
G = Number of Ports on each Central Switch It is possible by recabling to move from the one level Rotator configurations to two level Rotator configurations.

In all cases large Rotators are built from two stages of Rotators. The central switches are built from a number of basic switches described elsewhere.

8.3.3.1 Large switch growth options

The table shows the largest growth stage in a number of configurations and the basis for that number. In all cases there are 16 Rotator functions, and each central switch has 16 ports on it the variables are the size and configuration of the Rotators and the number of basic central switches in each central stage and the number of central switches. Other in-between configurations are possible.

| Size | A | B | C | D | E | F | G |
|---|---|---|---|---|---|---|---|
| 512 | 16 | 32 × 32 | 16 × 16 | 2 × 2 | 2 | 32 | 16 |
| 1024 | 16 | 64 × 64 | 16 × 16 | 4 × 4 | 4 | 64 | 16 |
| 2048 | 16 | 162 × 162 | 16 × 16 | 8 × 8 | 8 | 128 | 16 |
| 4096 | 16 | 324 × 324 | 16 × 16 | 16 × 16 | 16 | 256 | 16 |

Key to Table
A = Number of Rotators
B = Overall Rotator Configuration
C = First Rotator Configuration
D = Second Rotator Configuration
E = Depth of each Central Switch
F = Number of Control Switches
G = Number of Ports on each Central Switch It would be possible to mount the multiple elements to make the central stage dept on one or two cards as for the basic switch, the limitation is the board level IO.

8.3.3.2 Enormous Switch Growth Options

This configuration goes beyond the large type configurations by having more than 16 ports on each central switch. Growth to 32 ports on a central switch could be achieved by operating the control plane twice as frequently, higher sizes would require additional logic to manage the control plane.

8.3.4 Growth Stage Summary

There are many ways in which the switch can grow depending on the maximum target range.

It would also be possible to move from one growth range to another, by the use of recabling for unplanned growth.

8.4 Details of Growth for large switches

The use of technology and repackaging can achieve considerable saving for larger switch designs. There are three tupes to consider, larger Rotators, central switches that use longer cycles and central switches with more ports.

8.4.1 Larger Rotators

Large Rotators have intrinsically many connections. Two stages of Rotators can be cabled together (or connected on the backplane). Reduction in the card count (other than by technology improvement) can only be achieved by increasing the number of IO connections per Rotator card. The same Rotator devised is used in both stages, whether optical or electrical.

| Rotator type | Technology IO connections | Rate | Cards Required per rotator |
|---|---|---|---|
| 16 × 16 | 32 | 330M | 1 |
| 32 × 32 | 32 | 330M | 4 |
| | 64 | 330M | 1 |
| 64 × 64 | 32 | 330M | 8 |
| | 64 | 330M | 4 |
| | 128 | 330M | 1 |
| 128 × 128 | 32 | 330M | 16 |
| | 64 | 330M | 8 |
| | 128 | 330M | 4 |
| | 256 | 330M | 1 |
| | 32 | 660M | 8 |
| 128 × 128 | 64 | 660M | 4 |

| Rotator type | Technology IO connections | Rate | Cards Required per rotator |
|---|---|---|---|
| | 128 | 660M | 1 |
| | 32 | 1320M | 4 |
| | 64 | 1320M | 4 |

Much larger sizes can be built quite easily by continuing the theme of two card stages. The same rules apply to electrical and optical Rotators.

FIG. 11 shows a 32×32 Rotator made from 4 16×16 Rotators. Two of the Rotators are configured as (16×16)s, the other two are configured as sixteen 2×2 Rotators.

8.4.2 Long cycle time switches

Long cycle time central switches have the same number of ports but operate over a longer cycle. The inputs are shared over a number of switches and control units, only one of which will be outputting at once. Because of this longer cycle switches can be easily built from multiple switches and savings made by having more than one on a card, the limitation being board area rather than IO limitations.

It may be appropriate to have a board type for the basic switch and another growable one for the large switches than can be equiped to various levels depending on the switch size.

Figure 12:
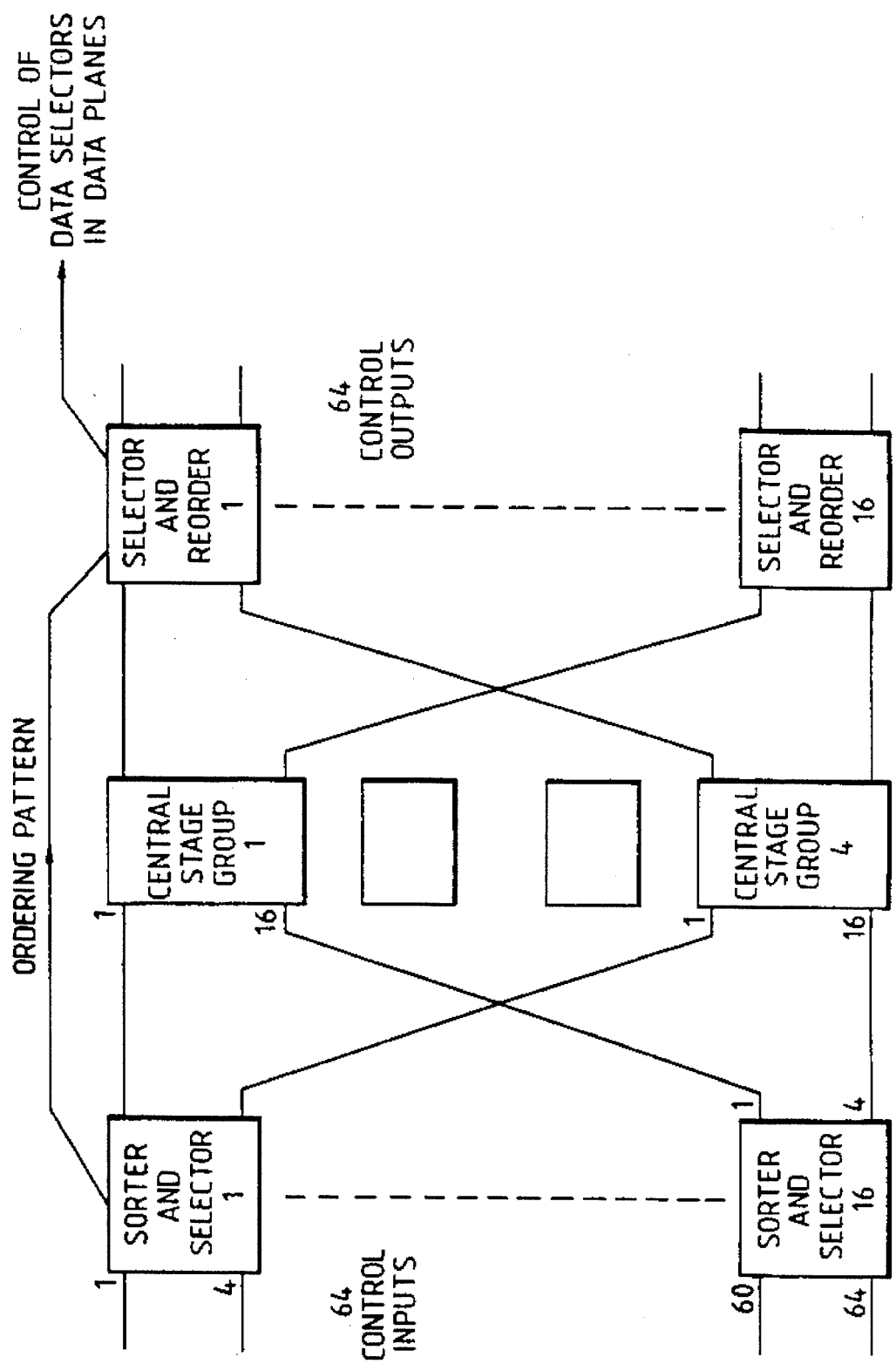
FIG. 12 shows a diagrammatic view of a control plane for an Enormous switch according to the present invention.

FIG. 12 shows how to make a longer central stage. The inputs go to both central stages, the outputs from both, but by use of appropriate configuration information the port controllers in the control plane can very simply act as part of larger switches. The "Full" signals that pass between each timeslot managers need to be passed across between the switches so that they are linked in the appropriate order.

8.4.3 Central Switches with more ports

These switches are more complex than simply having longer cycle times. The data planes can be built from multiple data switches as in the previous case, but this is not true of the control plane.

Growth to twice as many ports in the control plane might be possible with larger devices, that still operated serially on the control stream. But evolution to larger sizes can not be achieved without having to operate in parallel. Additional logic would therefore be needed outside of port controllers to manage multiple inputs that are on the same timing, and only allow one request to go through to the port controllers for each address at a time.

FIG. 12 shows the principles of the control plane for configurations with more than 32 inputs per stage. At the center are a number of groups, each of which is identical to the longer central stage used for large switches (FIG. 11), each group stores the data for 16 output ports. Around this there are a number of selectors to manage requests and answers from multiple simultaneous ports. These are sorted and steered to central groups to avoid collisions. The same data is then used to operate selectors in the data planes. This additional functionality adds to the fixed component of delay, but does not need very large Rotator functions. There is a slight increase in blocking probability for this type of switch, but it is not thought to be significant.

9. IMPLEMENTATION

The next few sections cover implementation issues. The order of coverage is as follows:

a) Switch Core using base technology assumptions. This will include the cards, the ASICs and the control messages. Not covered are clock distribution and maintenance issues (in a later section).

This core will include the capability to concatenate ports for high rate interfaces.

The basic technology assumptions are

| PROPERTY | ASSUMPTION |
|---|---|
| Logical internal data rates between ASICs | 49.152M |
| 1st implementation data rates between cards | 8 × 49M = 393M |
| Max IO optical ports per card | 32 at 393M |

The design will be described in terms of a implementation technology with card level interconnect at 393M. This can be scaled to many levels of technology, both simpler and more advanced than this level.

a) Enhancements using more advanced technology to the core. This can use higher rate interfaces, optical components, more IO per card, higher integration levels for the components.

b) The basic peripheral ports for 150M ATM. This describes the ASIC(s) needed for driving the switch, it does not cover translation or policing functions.

c) Enhanced peripheral ports for high rate peripheral ports. This enhances the previous section and indicates the appropriate changes needed at the peripheral for high rate interfaces. The core will have the functionality from the beginning to concatenate ports.

10. BASIC CORE IMPLEMENTATION DETAILS

There are many ways in which the logical architecture can be implemented in physical hardware. This section will describe one particular implementation in some detail, to demonstrate the feasibility of the design. This is the 288 port size, ways of packing for high sizes are described in the next section.

10.1 Cards

There are three main card types in the core of the switch (the Rotator and the two parts of the central switch).

10.1.1 Rotators (RX Rotator/TX Rotator)

The Rotator card is a simple design which is used for both the RX and TX Rotator functions. It will normally hold 4 replicas of the Rotator function. Note that the control plane Rotator operates a different timing phase from the data plane rotators and hence may need a different cycle start clock compared with the data plane Rotators.

10.1.2 Central Control

The central Control Card contains the central control function and 3 central stage data planes.

Its operation is completely determined by the control streams from the interface ports; it has no need for local microprocessors even for error monitoring or management. The operation of the functional components, is described in the next subsection on the ASICs.

Figure 13:
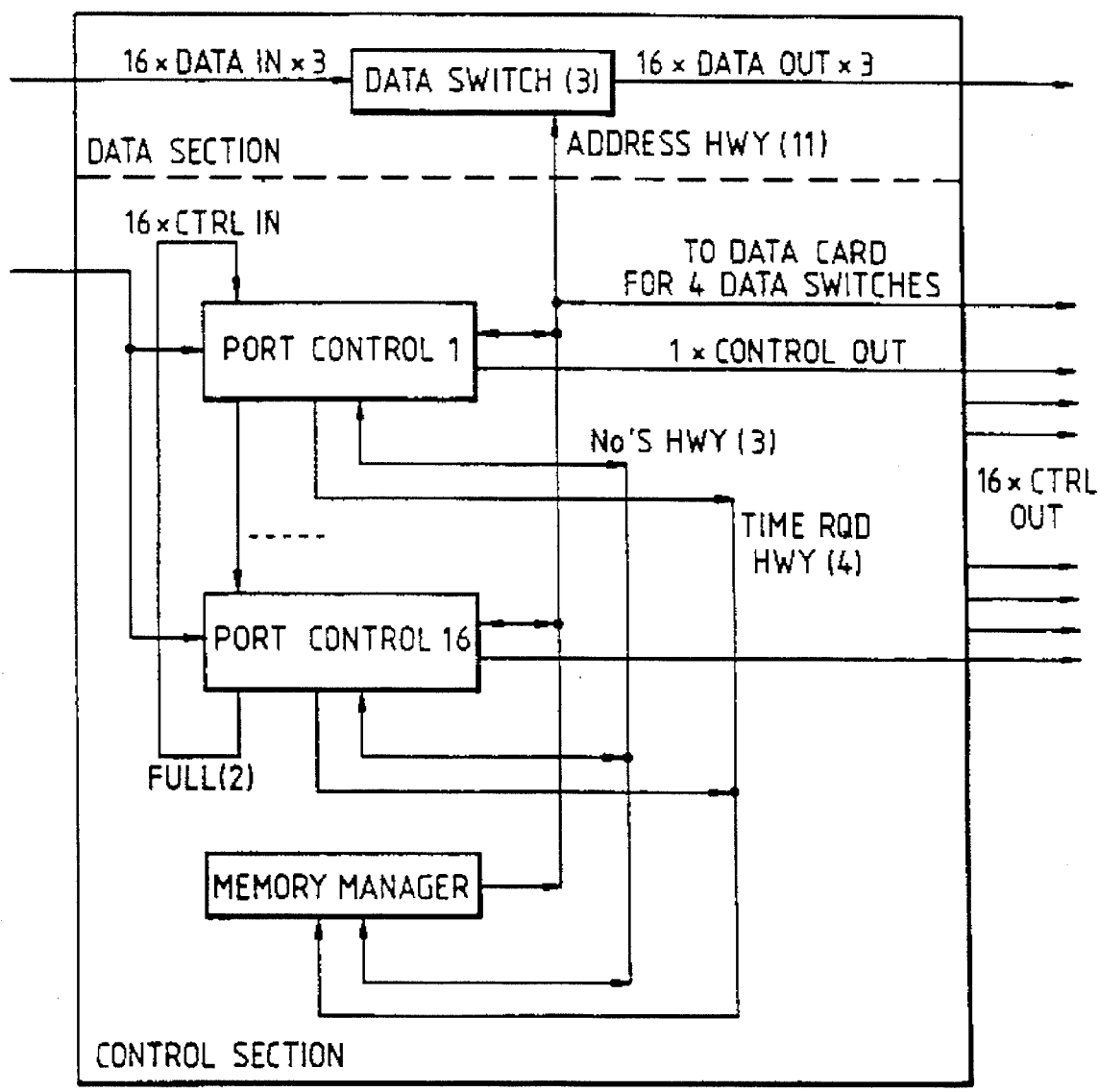
FIG. 13 shows a schematic view of a central control for a switch as shown in FIG. 7.

The central control is reasonably complicated as illustrated in FIG. 13.

10.1.3 Central Data

The Central Data Card contains 4 data planes.

10.2 ASICs

The ASICs are described herein in outline, on a functional block basis. They could be combined in some cases (with each other and with other miscellaneous logic such as multiplexors). Four Rotators could be combined together with multiplexors and de-multiplexors. A number of Central Port Controllers could be combined as they share a quantity of logic.

10.2.1 Rotator

This ASIC has 18 inputs and 18 Outputs, and cycles through 18 timeslots rotating the inputs over the outputs, in a cyclic manner. The device needs to be configured in a number of different ways to allow for efficient growth as follows:

| Configuration | Number |
| --- | --- |
| 18 × 18 | 1 |
| 9 × 9 | 2 |
| 6 × 6 | 3 |
| 3 × 3 | 6 |
| 2 × 2 | 9 |

In general for ATM traffic the timeslot will be 64 bits long, but for the control plane on the RX side, it will need to operate as a 48 bit phase and a 16 bit phase, with the 48 bit phase two timeslots in advance of the 16 bit phase. The 16 bit phase will align with the data planes. This is necessary so that questions and answers can be exchanged before data is sent.

Figure 14:
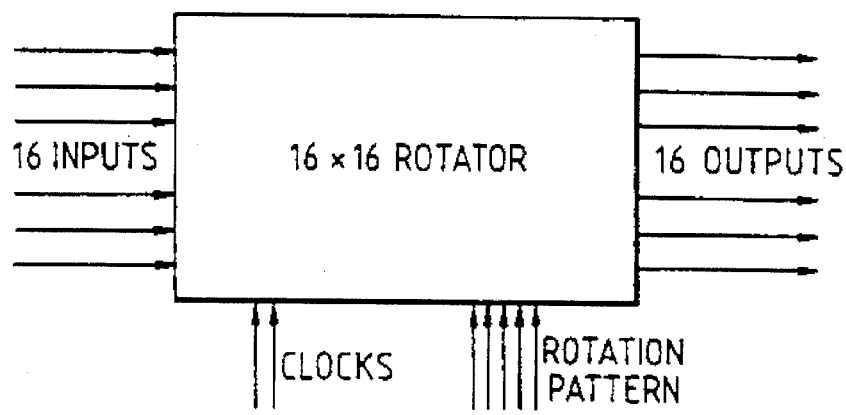
FIG. 14 shows a possible configuration for a Rotator ASIC.
Figure 15:
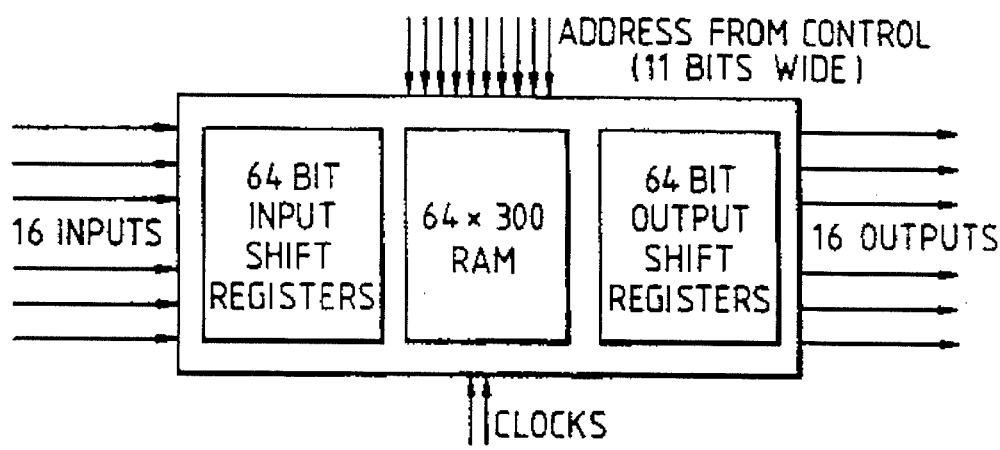
FIG. 15 shows a possible configuration for a Central Data Switch ASIC.

A possible configuration of this ASIC is shown in FIG. 14.

The rotation pattern gives the configuration of the Rotator for the current data. This could be generated internally if configuration information is given to the device. If necessary (owing to device pin count limitations or power limitations) the Rotator ASIC could be broken down into two stages.

10.2.2 Central Data Switch

The Central Data Switch has 16 inputs and 16 outputs each of which has a 64 bit shift register behind it, and a central block of 64 bits wide RAM. The inputs and outputs are staggered in time, such that one input is filled every 4 bits and one output is emptied every 4 bits. When the input data is filled it copied to the central RAM, when the output register is emptied it is loaded from the central RAM. The addresses are provided by the control plane.

The write address is that provided by the Memory management unit, the read address is provided by the appropriate central port controller. The write address would be generated by the Memory Manager 128 bits before it is needed in the data switch, this could either be placed in another Shift register on the data switch, or the memory manager could delay the sending of the addresses to the data switches after sending the addresses to the Port Controllers.

10.2.3 Central Control Memory Manager

Figure 16:
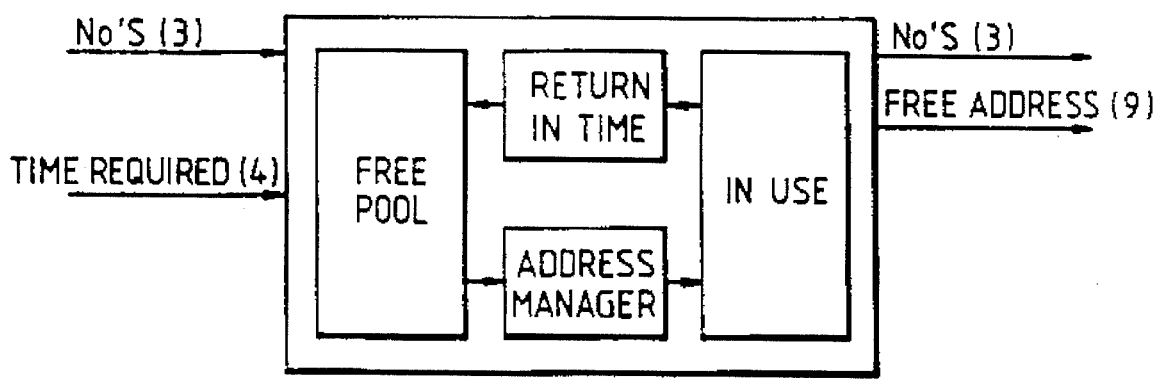
FIG. 16 shows a possible configuration for a Central Control Memory Manager ASIC.

The Central Control Memory Manager as shown in FIG. 16 resides in the control section of the central control card and manages the free space in the Data switches. For every control period this provides the address of a free store location in the Data switches. If a Port controller wants to use it that location is reserved for the period that the Port Controller requires it. For point to multiport applications, it is reserved for the maximum period that any of the Port Controllers needs it. If a Port Controller identifies that it is unable to handle the cell then the Memory Manager puts the location back into the free pool.

The design only allocates the space for fixed periods (a number of cycles), other designs were examined that tried to be more intelligent but they are more complicated to manage. There is a penalty on memory in the Data Switches, but it is not enough to be significant.

Note that if the space is not required, the data switches can still simply use the address given to store the data, the fact that the data will not be used would not matter, the location is likely to be reused very soon by the memory manager.

The incoming "No's" if all are set to "No" indicate that no space is required this cycle. The control memory manager sets the 3 "No's" itself if it has run out of free space. The time required is the number of cycles that the location is required for. By having 1 signal per cycle, the result can be determined by ORing the signals from each of the port controllers to obtain the maximum period required. This time is one cycle for P:P and P:MP traffic and a small fixed range for P:MP, the figures here assume that four signals are needed, it may only require 2 or 3.

The device is not very demanding in terms of complexity (apart from operating at 20M) and could be built from a programmable logic device and a small RAM.

10.2.4 Central Port Controller

Logically there is a central port controller per physical output port in the central stage i.e. 16 of them. However two or more may be realised in one package as appropriate depending on the technology level used. The Broadcast RAM is probably the limiting factor, since for 1000 broadcast channels and 18 timeslots 18 bits of memory would be required per port. The description that follows is for one port controller per package, it is expected that at least 2 is possible, and perhaps 4 with present technology.

Each central port control function looks at all 16 incoming control streams and answers those questions that are for the port it is controlling. It additionally drives the outgoing control stream for its port. Also it provides the read addresses to the Data Switches for cells to be output on that port in the data planes.

The basic functions of this device are described below:

a) It looks at the request phase of the input control streams. If there is a point to point question that it should answer (in its address space) then it sets the appropriate "No" signal, if the requested address is not empty. It indicates that it wants the memory location for one cycle, if it is able to satisfy the request.

b) If there is a point to multipoint request it examines each output port (and timeslot on that port) involved in the broadcast conection, by using its broadcast memory. If the requested outputs are full it sets the appropriate "No" signal. It indicates the maximum number of cycles it needs the memory location, for if it is able to satisfy the request.

c) If there is a point to a few point requested for its output port(s), then if the requested address(es) are not empty it sets the first "No" signal, and sets the other "No" signals to "No". It indicates that it wants the memory location for one cycle, if it is able to satisfy the request.

d) If there is no question (or the question was invalid) it sets the corresponding "No" signal.

e) If the answers should be sent by its outgoing control port, it sends the results of all three questions ("No" signals) in the outgoing control stream. These "No" signals could be from other port controllers or even the memory manager (no free memory).

f) If it had a request for its output port for a point to point (a above) or a point to multipoint (b above) and the earlier "No" signals (if any) were "No" and the appropriate "No" signal is not "No" then it has a valid cell to cater for.

g) For a valid cell it stores the address that the memory management unit has given it along with a record of how many cycles it will occupy (only for point to multipoint).

h) When the information phase of the cotnrol cycle arrives, it checks that the data has actually been sent to the central stage (for 600M and above it may not always be sent). If the data has not been sent it changes the status to indicating the slot is busy, but empty. Later when it sends data to the output port it can say no data has been sent. Keeping the slot busy prevents timing complications.

i) When the time comes to tell the data switches what to output for the port at that timeslot, it sends the address it has stored to access the data, and updates the stack of waiting addresses if needed. If the cell is point to multipoint it also sends on the control signal the time it has waited.

j) When there are no questions, the incoming control streams may contain updates to the broadcast RAM and access to any control registers needed. The responses would be sent on the outgoing control stream.

Figure 17:
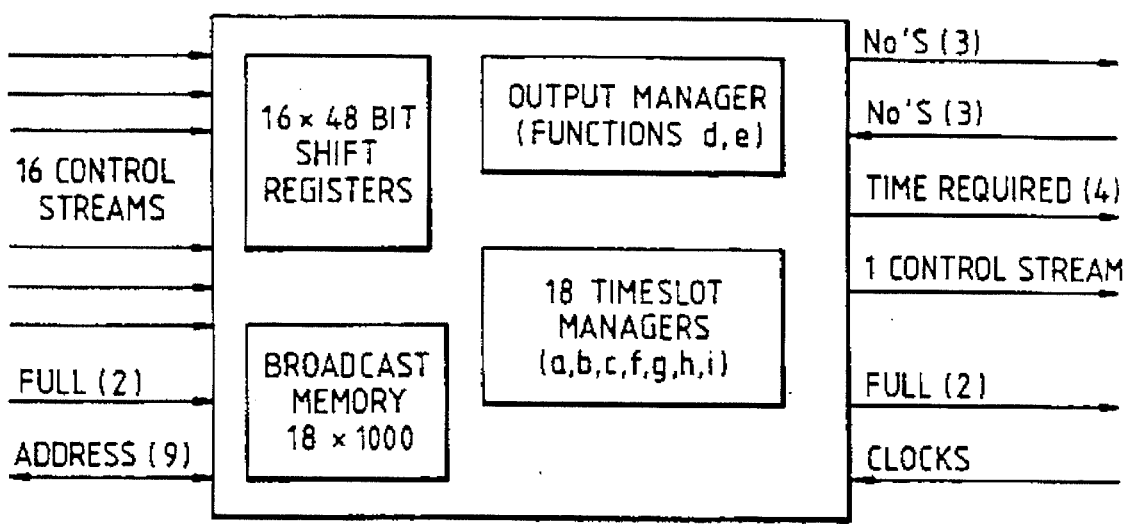
FIG. 17 shows a possible configuration for a Central Port Controller ASIC.

The above summarises the actions have to be performed. Note some are one at a time for the port as a whole, and some for each of the 18 timeslots. A rather simple schematic is shown in FIG. 17.

If more than one unit is in a package there is 1 extra output control stream per port, and the "Full signals should be brought outside so that they appropriate way for large switches. The rest of the IO is common. The input shift registers would be common but the rest would be required per port.

10.2.4.1 The 'Full' signals

The core of the switch needs no changes to receive calls and questions from high rate ports, the only changes relate to the outgoing side and the provision of 'Full' signals.

To ensure cell sequence integrity, the 4 appearances of a 600M port, would be treated as one port that operates faster (four times a cycle). All of the timeslots for that higher rate port will be handled within a single port controller in the central stage, in adjacent timeslots.

To handle these large ports, it is necessaary to chain together the timeslot managers in a central stage that are involved with the high rate port. Each timeslot managers associated with the external port, will be configured so that the same port appears a number of times, i.e. every timeslot is the same.

Each of the port controllers involved does the following additional functions, these functions need only be invoked for ports greater than 150M, the others unaffected.

a) If the Timeslot Managers buffer is full it sets the "Full" signal, unless it is the last timeslot manager involved in the port, i.e. the last of 4 for 600M.

b) If the request is for the Timeslot Manager, and it is the first manager for the output port, or the "Full" signal from the previous manager is set, then the timeslot manager attempts to determine whether it has free space for the request and sets the time required for the memory manager.

c) If the timeslot manager is the last involved, and it does not have space it answers "No".

Thus only one timeslot manager will take the cell, if there is space.

The operation for multicast connections is in principle the same, but it uses a second "Full" signal that indicates the timeslot manager is full of broadcast traffic. The timing requirements are less onerous if the system uses two separate Full signals.

10.2.4.2 Configuration Changes above 2.4 G

The logic that operates for ports below 2.4 G also applies above 2.4 G, the timeslot managers from one port controller are chaned to the next port controller in the same way.

As there will be more than one port controller involved, the delay through them is not quite the same, but the variations a few bits) is less than the variation via other routes (Whole timeslots) so that the cells will still remain in sequence.

The way in which the port controllers are linked is different for the basic switch and the large switches, and for this reason the linkage should be outside the ASIC. Adjacent port controllers are linked for the basic 288 port switch, but where they are grouped together for longer cycles, the port controllers for the same port should be linked before adjacent controllers.

10.2.4.3 Timeslot Manager Summary

Figure 18:
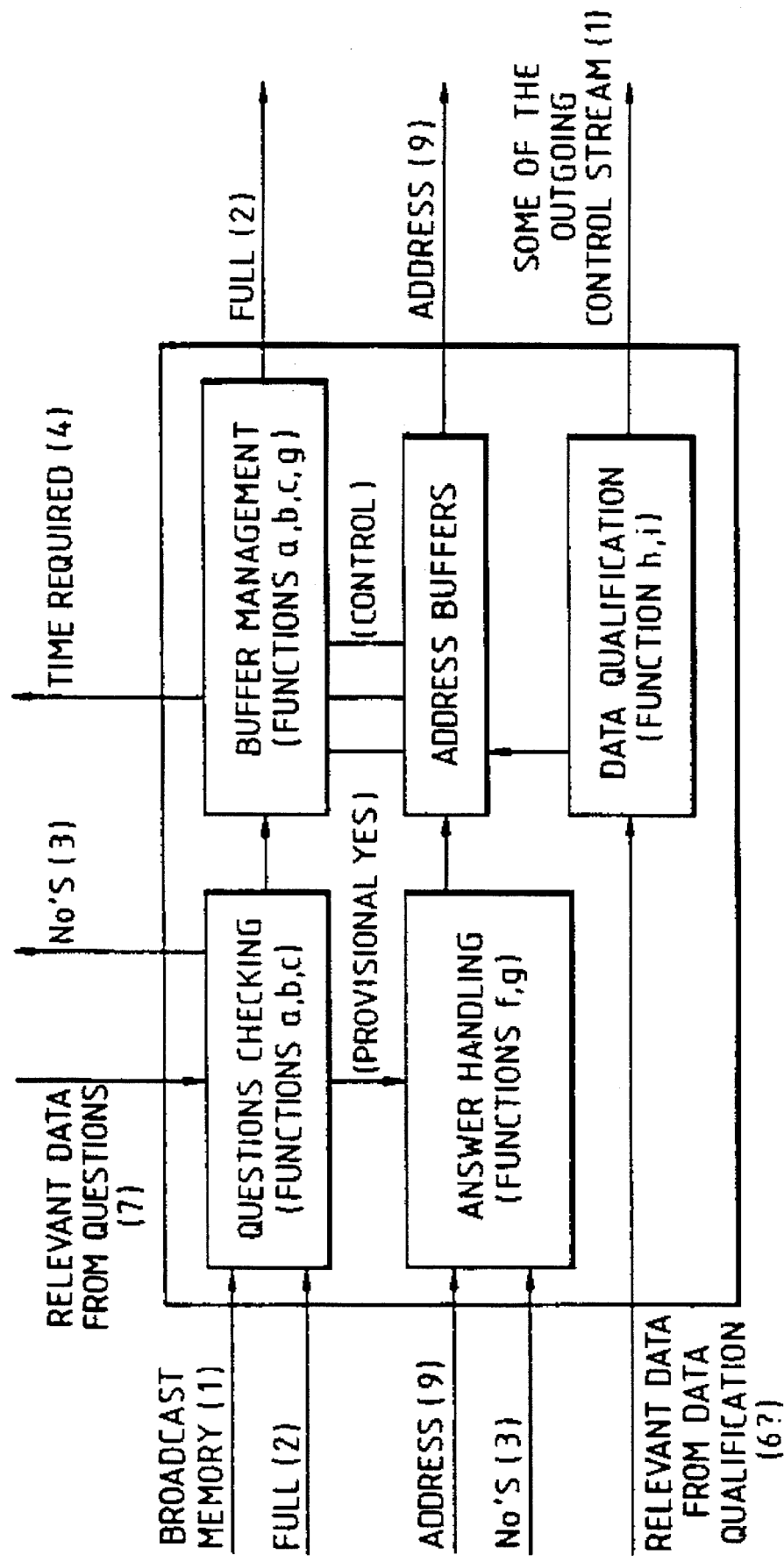
FIG. 18 shows a schematic view of the operation of a Timeslot Manager ASIC.

Each Timeslot Manager can itself be broken down as shown in FIG. 18.

The requirements for the ASICs assume that the RX and TX Ports manage two planes of the switch and that there is no multiplexing to higher rates included.

| Property         ASIC | Rotator | Data   | M Mgr | P Ctrl   |
|-----------------------|---------|--------|-------|----------|
| Complexity of logic   | None    | Low    | Medium| High     |
| Memory Config         | None    | 64×300 | 8×1K? | 1K×18    |
|                       |         |        |       | 18×8×16  |
| Total                 | 0       | 8K     |       | 20K [1]  |
| Pins in at 41M        | 18+5+2  | 16+2   | 2     | 16+2     |
|     in at 20M         | 0       | 9      | 4     | 2        |
|     out at 41M        | 18      | 16     | 0     | 1        |
|     out at 20M        | 0       | 0      | 9     | 2+4      |
|     Bidi at 20M       | 0       | 0      | 3     | 9+3      |
| Total before pwr      | 43      | 43     | 18    | 39 [2]   |

[1] If more than one function is in a package this is the per function memory.
[2] If more than one function is in a package, add one 41M output (the control), two 20M inputs (Full signals) and two 20M outputs (Full signals) per function.
None of these divices needs a microprocessor interface.

10.3 Control

Control is needed for path setup and for maintenance. No action is required in the core to setup a point to point or a point to few points connection. The requirements for point to multipoint are very simple and these can be driven from the periphery of the switch from the RX port, thus there is no need for microprocessors in the switch core.

10.3.1 Path setup

Path setup is achieved by setting up the data in the header translation unit to identify:

a) The type of connection, point to point, point to multipoint or point to few points.

b) For point to point traffic, the port the traffic is destined to.

c) For point to few points traffic, identifying the ports the traffic is destined to.

d) For originating point to multipoint traffic, identifying the broadcast channel number, this is used to address the broadcast RAMs in the central port controllers.

e) To receive a multicast channel, the broadcast RAMs in each of the central port controllers need to be updated. This can be achieved by using any of the ports and sending an update to each central switch.

10.3.2. Configuration control

There will need to be a few registers to control the configuration of the switch. Those in the ports can be directly set by a controlling micro, those in the central switch by using the same path as for updating the broadcast RAM.

a) State of central switches. Each RX and TX port should have a mask so that each individual central stage can be masked out. If one of the pair has failed this permits the rest of the system to maintain synchronism, alternatively the whole plane can be disabled.

b) Configuration size. The Rotator clock generators, and the central switches need to know what switch size to oeprate as i.e. 18, 9, 6, 3 or 2, there are several slight variations for 2 and 3 slots these correspond with different growth stages and affect the central stage rather than the Rotator. See Section 4 for a description of the growth stages. This could be provided once in each port controller and used in one of them.

c) 600M and larger Ports. The central stages need to know that there are large ports so that they can chain timeslots together. This requires a little information to be loaded into the appropriate port controller. For very large ports (greater than 2.4 G) it is necessary to chain port controllers together. The configuration needs to identify, whether to generate and/or to use the "Full" signals between the timeslot managers in each port controller.

10.3.3 Maintenance

The control for maintenance is covered in a later section in detail.

10.3.4 Message Formats

The format of the control stream to and from the central stage carries a lot of information. The following is an example of a way in which it could be structured.

The control flow from ports to the central stage is divided into two sub phases; the question phase of 48 bits, and a data qualification phase of 16 bits.

There are many different ways this could be constructed. The formats below show how formats would work for sizes up to 8K ports.

10.3.4.1 From Ports to Central Stage Question Phase

| | TO CONTROL (Questions) | |
|---|---|---|
| Request Type | Type dependent see below | Orig port and check |
| (4) | (39) | (7) |

The Request Type (Rtype) indicates contents of main control field, the Type Dependent is covered below.

The seven spare bits are used to encode the originating port number and a check code, this is used to check for rotator errors.

| Rtype | meaning | Use of Type dependent field | Spare | Note |
|---|---|---|---|---|
| 0 | No data | Not used | 39 | |
| 1 | 1 P:P req | Port1 (13) | 26 | |
| 2 | 2 P:P reqs | Port1 (13), Port2 (13) | 13 | |
| 3 | 3 P:P reqs | Port1 (13), Port2 (13), Port 3 (13) | 0 | |
| 4 | P:MP req | Broadcast channel number (10) | 26 | |
| 5 | P:2P req | Port1 (13), Ports (13) | 13 | |
| 6 | P:3P req | Port1 (13), Port2 (13), Ports (13) | 0 | |
| 7 | P:P mtnc | Port1 (13) | 26 | [1] |
| 8 | Set B'cast | B'cast channel number (10), Port (13) | 16 | [2] |
| 9 | Clr B'cast | B'cast channel number (10), Port (13) | 16 | [2] |
| 10 | Free B'cast | B'cast channel number (10) | 29 | [3] |
| 11 | Set T/slots | Size (4) | 35 | [4] |
| 12 | Port State | Port (13), Config type (3), State (2) | 21 | [5] |
| 13 | Port States | Port (13), Configs (5×3), States (5×2) | 1 | [6] |

Other messages might be needed when detailed FMEA identifies any other registers for errors it might need, and to perform any other functions. If the Rtype field runs out then a few bits of the type dependent field could be used to indicate more detail on the messages.

[1] This is used for maintenance messages that need to be passed when normal traffic is disabled for the port.
[2] To set and clear broadcast RAM entries, for individual users of a broadcast channel.
[3] Used when releasing the provider of a broadcast channel.
[4] To set the system configuration (changed during major extensions) i.e. the number of timeslots in a cycle. This needs to indicate the following configurations:-

| Config | Meaning |
|---|---|
| 0 | 18 timeslots per cycle |
| 1 | 9 timeslots per cycle |
| 2 | 6 timeslots per cycle |
| 3 | 6 timeslots per cycle, locked as 3 pairs |
| 4 | 6 timeslots per cycle, locked as 2 groups of 3 |
| 5 | 3 timeslots per cycle |
| 6 | 3 timeslots per cycle, locked into a group of 3 |
| 7 | 2 timeslots per cycle |
| 8 | 2 timeslots per cycle, locked as a pair |

The locked configurations are used at small sizes to gain diversity. When locked as 3, requests in timeslot 1 only respond to the 16 ports in timeslot 1 etc.
[5] To set the mapping of ports used for high rate ports. The Config type indicates the linkage if any between timeslots on the port controller and between port controllers, the configuration types are:-
- Single ATM port (1 timeslot used, not linked)
- First 150M of large ATM port (Set "Full")
- Middle 150M of large ATM port (Set and Read "Full")
- Last 150M of large ATM port (Read "Full")
- Each port can be in one of 3 states a) Full disabled - No traffic from the port
b) Maintenance Only - Only cells with the special maintenance request are allowed.
c) Fully enabled - All traffic allowed through.

[6] Bulk version of previous command, (if necessary), the port identifies the first of 5 ports to be updated.

10.3.4.2 From Ports to Central State Data Qualification Phase

TO CONTROL : DATA Status

Data Destination Delay

Sent Port Priority (2) (13) (2)

The DATA Status has details about the cell being carried. The Sent field indicates whether the cell that was accepted has actually been sent in the data streams. This field is needed because the RX port has to ask more questions before it has received answers to the first lot. It has a choice of either asking about other ports (if it has some), the same ports (if more than one cell waiting for the port), and asking anyway (indicating that the data can not be sent if it is not available). The appropriate method depends on the data rate for the port, and the type of traffic mix the switch needs to carry. And will be modelled to determine how the required performance can be achieved.

The Destination Port number (or Broadcast channel identification) is just a confirmation that the data is as expected, if it is not then the central stage should ignore it. (Data Not sent). The Delay priority might be useful in managing the outgoing cell queue in the TX port. This could alternatively be sent through the data streams.

10.3.4.3 From Central Stage to Ports

There is a lot of freedom in how this is used. It has 64 bits (that do not need to be split into 48 and 16, but can be if it makes the timing easier to manage) that need to carry the following:

a) Answers to ATM questions (2 bits): These must be sent about 32 bits in advance of the data being sent from the RX Port to the Central stage. Answering the STM questions requires 7 bits, one for each data plane.

b) Type of ATM data (None. P:P, P:MP, P:FP): Must be coincident with the data from centre to Output port.

c) Delay cycles (P:MP traffic): Must be coincident with the data from centre to Output port (ATM only).

d) Any return maintenance information or statistics requested.

e) Any delay priority information passed through the control stream: Must be coincident with the data from centre to Output port. (ATM only)

f) It might be useful for maintenance reasons to include the identity of the originating port and the address it has used in the data switches to store the cell. If the stored address is sent note that the two planes are very unlikely to use the same address.

11. ENHANCEMENTS TO THE CORE

The implementation of core of the switch can evolve as technology improves, without changing its logical structure or operation.

There are a number of possible areas of evolution listed here, any or all could be adopted, there is little or no dependence between them.

If the data can be transmitted at 330M, then the two Rotator cards for each Rotator function can be merged into one card, and a whole central switch stage can be mounted on a card.

If the data can be transmitted at 660M then a further factor of two decrease can be achieved by mounting 2 Rotators or 2 Central switches on a card.

As memory on ASICs improves then multiple Central Switch Port Controllers can be provided in one package. It may (depending on the broadcast RAM requirements) be possible to ultimately make the control plane into one device the same as for the data switches.

The use of optics for the Rotator function would make their operation passive.

Further, using optics for the connections between ports to the Rotators and from the Rotators to central switches, permits the use of bi-directional photonic Rotators thus combining the RX and TX Rotator cards, and halving the number of fibres. This would allow more central stages to be put on a card as well as they only use half the IO.

If orthogonal backplanes can be used (i.e. Rotator cards are mounted at right angles to the central switching cards) then by direct coupling of Rotators and central switches considerable reductions in size can be made.

The use of evolving technology is shown in the table below, which is for one plane of a 288 port switch, this assumes that the number if IO connections per card remains the same, if it doubles then use the entry for twice the technology level in use.

| Internal between card technology level | Number of cards | Card Types |
| --- | --- | --- |
| Basic system (l65M) | 100 | 3 |
| 330M interfaces (no optic Rotator) | 50 | 2 |
| 660M interfaces (no optic Rotator) | 25 | 2 |
| 1.3G interfaces (no optic Rotator) | 13 | 2 |
| 2.6G interfaces (no optic Rotator) | 7 | 2 |
| 330M optic interfaces (optic Rotator) | 25 | 2 |
| 660M optic interfaces (optic Rotator) | 13 | 2 |
| 1.3G optic interfaces (optic Rotator | 7 | 2 |
| 2.6G optic interfaces (optic Rotator) | 4 | 2 |

12. PERIPHERAL PORT DETAILS

This section covers the details of the peripheral port that are tied to the switch architecture, although translation and policing are mentioned they are not covered in depth.

This section covers the two principle ASIC functions required (one for the RX an done for the TX) and then shows some of the problems about the question asking in the RX function.

12.1 Peripheral Port block diagram

Figure 19:
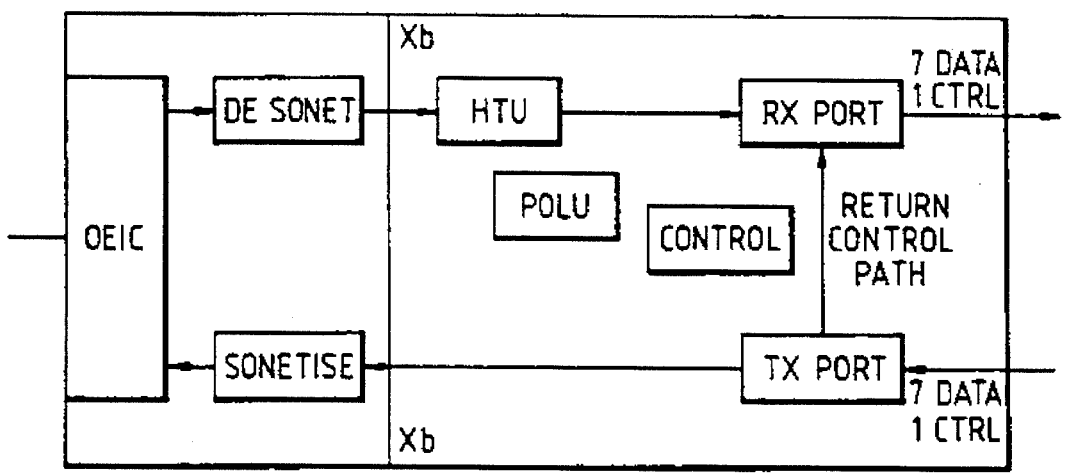
FIG. 19 shows a block diagram of the Peripheral Port support ASIC.

The peripheral, as shown in FIG. 19, supports the Xb interface of the switch described in GB 2224417A, and can use the existing HTU and Policing units. The RPCU is tied to this switch architecture and is not appropriate here, but there is an equivalent function in the TX port.

The Rx Port area is shown as a separate ASIC for clean functionality but it could be combined with the HTU and/or the TX Port device.

In general, this description covers the functional architecture. The position that the Port splits into two planes could be varied, however the synchronous nature would be the same; the difference would be the amount of hardware that was protected by the core redundancy mechanism.

The 7 data and 1 control signals (all 41M) would probably be multiplexed as onto 2 links at 165M.

12.2 ASICs

The ASICs are described here in outline, on a functional block basis. They could be combined in some cases (with each other and with other miscellaneous logic such as multiplexors). For instance the RX and TX ports could be combined, together with multiplexors and de-multiplexors.

12.2.1 RX Port

Figure 20:
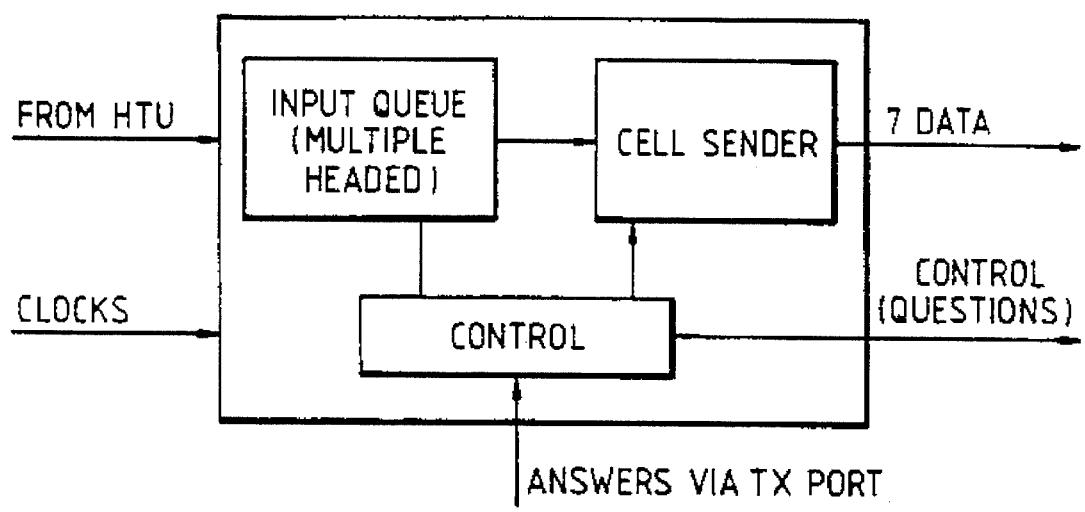
FIG. 20 shows a possible configuration for an RX Port ASIC.

This ASIC, shown in FIG. 20 asks the central stages in turn if they have space for a given output port, and sends the data as appropriate. Although there is a small queue in this device there is no need to consider priorities due to its small size and the very unlikely event of it ever overflowing. It is possible that this could becombined with the TX device, and/or with the HTU.

12.2.2. TX Port

The basic TX port function is fairly simple being mainly an output queue. This unit may have two planes from the switch but the logic described is the same in both cases. It passes to the RX port the data it requires from the control stream.

The device provides retiming of point to multipoint cells as necessary to compensate for any delay incurred by using forward transfer in the central stage. It also retimes cells that pass to/from a higher rate port (such as a 600M port) to compensate for the timeslot offset within the concatenated ports used.

It then places all cells in the output queue. In managing the queue, this implements cell loss priority and possibly cell delay priority.

The size of the output queue is given by the maximum accepted delay. The size of the multipoint retiming store is subject to mathematical analysis but the simulation suggests that it never needed to be more than 20 cells. Far less is required for high-rate retiming.

As cells are taken from the output queue, any cell replication and/or retranslation required is performed. This provides for fanout to multiple VPCs or VCCs on the same port, and for fanouts where different outgoing VPI:VCI values are required at each port.

Cell replication and header retranslation is controlled by a table giving a list of VPI:VCIs that require copies of the cell. While copies are being transmitted, the cell is not removed from the output queue. The header of each copy is retranslated as the copy is made.

Retranslation may also occur Men cell copies are not being made, as the cell is removed from the queue. The same table is used for both functions. Using this table in this way is quite a simple function, and does not add much complexity to the ASIC.

Figure 21:
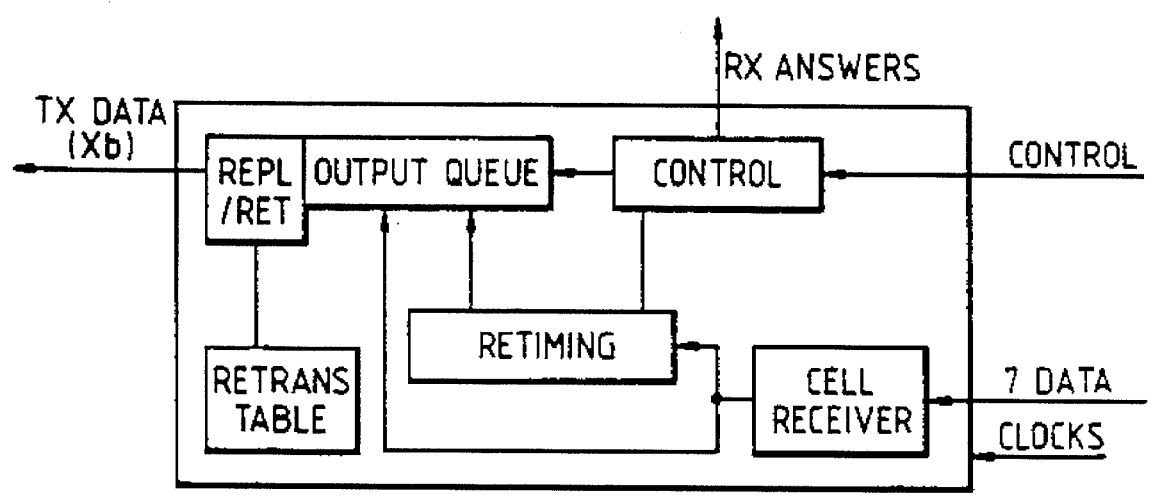
FIG. 21 shows a possible configuration for a TX Port ASIC.

The schematic of the device is shown in FIG. 21.

12.2.3 ASIC Suntartary

The requirements for the ASICs assume that the RX and TX Ports manage two planes of the switch and that there is no multiplexing to higher rates included.

| Property | ASIC | RX Port | TX Port |
|---|---|---|---|
| Complexity of logic | | Medium | Low |
| Memory Config | | 12×64×8 | 120×53×8 [2] |
| | | | 50×53×8 [3] |
| Total | | 6K | 72K |
| Pins in at 41M | | 4 | 10 + 8 |
| in at 20M | | 11 | 2 |
| out at 41M | | 8 + 8 | 1 |
| out at 20M | | 0 | 11 |
| Total before pwr | | 31 [1] | 32 [1] |

[1] These may be combined, thus reducing the requirements by about 4 pins. The pin count of these functions do not include access for the controlling micro to manage the devices.
[2] The size of this which is the main cell queue, relates to the maximum delay acceptable for the system, and may have to be changed when requirements are set.
[3] The size of this which is retarding multicast traffic, depends on mathematical anaysis, the figure quoted here is probably an overestimate, the simulation never needed as many as 20.

12.3 Asking Questions

The RX port has many choices as to how it is organised to ask questions about the cells it has in its input queue. There are substantial performance improvements possible by being logical in what questions to ask. The results in Section 9 were obtained by using some logical principles for the question asking. These include:

a) Asking two alternate sets of questions, as there are two sets of questions outstanding at any one time. These will be referred to as set A and set B. Note that two sets of questions are asked before one set of data is sent, therefore if the first one is accepted it reduces waste on the second one.

b) When there are two or more cells to be sent asking different questions, or at least in a different order on alternate central stages.

c) It is acceptable to ask a question about the same port in every set of questions if there are two or more waiting to be sent to the same port.

d) The types of questions asked are determined by the first entries in the queue. Set A depends on the first cell in the queue, if it is a broadcast cell it is sent, if a point to point cell then that cell and two ones to different addresses are sent.

e) If the first entry is a multipoint cell then set B uses the same principles as above but starting on the second entry.

f) Otherwise if there is a multipoint cell in positions two, three or four, then this is sent as set B.

g) Otherwise choose three different questions to those in set A, if possible.

h) In addition to the actual questions asked, if the input queue is longer than a programmed size and the question in this set is for a multipoint cell, set the Forward Flow Control bit, to permit use of restricted access central switch space.

3. DETAILS OF HIGH RATE PERIPHERAL PORTS

The basic design so far has described the use of the switch core for 150M ATM ports. For higher rate ATM interfaces ports, several links to the core are used under the management of the interface's RX port controller. In principle this design can cater for ports of any bandwidth.

To operate at higher rates the main changes would be at the periphery of the switch to have high rate ports which feed multiple links to the switch core. The switch core needs to be configured slightly differently for the high rate ports, changing the configuration for the high rate ports does not affect the operation for existing lower rate traffic. The core configuration changes are very small and can be allowed for in the implementation for 155M interfaces. The change in the core is the same for any higher rate, it just affects more of it.

There are no restrictions on making connections between different rate ports.

13.1 High Rate Interface Ports

A high rate port has to manage multiple links to the centre of the switch from a single queue of cells. To do this it has several sets of questions outstanding to different central stages, and has to co-ordinate them.

Other than working faster to handle multiple links, it must ensure that it asks different questions to different central stages if possible, so that it does not have too many outstanding questions for the same port compared with the number of cells for that output port. Note that this would work for 150M ports as well, but is not necessary.

For 600M ports, the port would handle 4 separate links to the switch core, these will be exactly one timeslot apart in phase but are aligned at the timeslot level (due to the fact that they use a common rotator). Likewise a 2.4 G port would handle 16 links that are each one timeslot apart in phase.

A 9.6 G port however would have four set of links, with each set having 16 equally spaced timeslots, but the sets would be offset in time by 4 bits. It is probably convenient to give such ports the full capacity of all four of the Rotators (72 links) rather than try to allocate the 8 unused links to the Rotators it strictly requires.

13.2 Ports At Rates Above 2.4 G

With these there will be more than one Rotator involved, the delay through them is not quite the same, but the variations (of a few bits) is less than the variation via other routes (Whole timeslots) so that the cells will still remain in sequence.

14. ATM AND CORE MAINTENANCE

The synchronous predictive operation of the switch makes multiplane operation easier permitting, the same design to be used in 2 or 3 plane redundant systems.

Most of the following description assumes that it is operating in a 2 plane environment.

ET maintenance includes failures of the Header Translation Unit, Policing unit and related areas.

14.1 The switch

The synchronous operation allows 2 or 3 planes to be used between the input port and the output port. If the failure is of one of the central switches there is a simple option to blank out that central switch in all planes and maintain multiplane synchronised operation. It is also possible to blank out a whole plane.

If synchronisation between the planes is lost due to these faults, then the switch will realign itself, after a brief period. Once the faulty area has been removed from service, or repaired.

The three spare octets in each cell transferred can be used to hold a check code and sequence number if required. (Note use of a sequence number as in the RPCU, makes fan-in calls impossible).

14.2 Port Redundancy

The synchronous nature of the switch and known delay characteristics make both 1:1 and 1:n Exchange Termination (ET) redundancy possible.

For 1:1 redundant operation a pair of ports can be locked together for all messages, or a pair of ports (anywhere on the switch) can make use of the point to few points capability in the switch, to operate as a pair of logically similar ports.

For 1:n redundant operation the switch cannot have the replacement mappings stored and it must change configuration on the fly. However as the switch does not need to have internal routing the change can be broadcast to all ETs which can then simply translate the port numbers in the HTU that are affected.

It is necessary to have a mechanism to block traffic from faulty ports. This can be simply done in the central controllers by enabling or disabling individual ports. When disabled it can be put into a semi-active state that still allows some maintenance diagnostic information through, but not normal traffic.

14.3 Switch Maintenance Details

There are many details about the switch that need to be considered in more detail to show how it can be maintained.

14.3.1 Error Detection

Having two (or more) synchronous planes, it is simple to detect discrepancies between the two planes in the TX port device. See the next heading on the selection of correct data.

The extra data capacity of 3 octets in the cell could be used to carry a per data plane check as well as a total message check. This can be used to localis errors. The structure of this checking space can be optimised to catch con, non mode failures.

The control plane will include a CRC over the questions and the ports number, which (if wrong) will cause the central stage to ignore the questions. A field indicating the actual port number that is continually checked (in case of Rotator errors), and a repeat of the destination port to double check that information. Further checks are being considered.

14.3.2 Data Plane Selection

The method of determining the correct plane for the data needs to be considered as the synchronous nature should make it easier. The cell has space for check codes and/or a sequence number. Sequence numbers should be avoided (if possible) as they prohibit the use of fan-in connections on the switch.

If a fault is found in a data plane due to the 3 octets of check information then correct data can be chosen from the other plane.

Errors in the control plane are a more complex problem to resolve.

Errors in the controls in the control stream can include port identity checks (to check for Rotator errors) and a CRC covering the Questions and commands.

14.3.3 Fault Location

If the TX Ports record the time that the discrepancy happened with respect to the timing cycle then this points to a central stage (or the Rotator).

The use of per plane data checks and whole message checks, can be used to detect and locate faults in the data planes. By knowledge of the time (in the cycle when the fault occurred) and plane this points to either a Rotator or a central data plane.

By combining data from each central switch through the Rotator to the port that detected the fault and others on the same Rotator, the fault can be localised to the appropriate Rotator, Data switch or the communication paths.

14.3.4 Fault Reconfiguration

The system has the choice of locking to the good switch plane for all traffic, or masking out the central switch that has a fault in both planes, or masking out the central switch that has a fault in one plane.

Locking would be the simplest, and for some types of fault is the only option. Masking the central switch in both planes means that the full service would continue including error detection, but at marginally reduced capacity. Masking out the faulty central switch in one plane will mean that the error detection capability in the remain plane will be limited.

14.4 Synchronisation Recovery

With a 2 or 3 plane Turbine, it is a simple matter to bring an idle or "empty" plane into complete state synchronisation with a working plane. This must be done when the second plane is brought back into service after the correction of a fault, or when one plane has been "grown" to a new major growth stage.

If the same cells are sent to both planes simultaneously, the switch will eventually settle into the same state on both planes. This has been proven by simulation. However, the time this takes can be greatly reduced by using the following technique.

Firstly, a START RESYNC instruction is sent by one of the ETs to all the central stage. This tells them to ignore the second and third questions in a request, so they will only OK or REJECT the first address offered. This restriction lasts for one complete cycle in each central stage, and ensures that all point-to-point traffic matches in both planes. The central stage will also pass the START RESYNC message on to the other ETs as the cycle proceeds.

While the "idle" plane is being recovered, questions are sent to both planes. The answers received from the working plane are then used by both working and idle planes. Note that since the idle plane starts with empty cell stores, there will always be cell space where required.

At the end of one cycle, both planes will be completely in synch, provided that there is no multi-point traffic present on the switch.

Multipoint traffic confuses the issue since there could be cells in the forward transfer area of the working plane, so new cells might not receive the same treatment on both planes. For example, a cell could be placed in the second rank on the working plane, but in the main rank on the idle plane.

Fortunately this condition is unstable, since as soon as the main rank for a port becomes empty, the two planes will be synchronised for that port in that central stage. Therefore a large proportion of these stores will become synchronised each cycle.

This effect can be given an upper bound by setting a time limit of say 20 cycles. Any central stages that have not resynchronised their ports by this time are then required to reject any multipoint cell destined for such a port. Three cycles after this, the switch will be fully synchronised. Thus the maximum time to resynchronise a new plane could be about 25 cycles, which is less than 1 millisecond.

When a central stage has resynchronised for all output ports, it passes a IN SYNC message to the ET which originated the process. Once all central stages have done this, the controlling ET sends a SYNC COMPLETE message to the first available central stage, which broadcasts it to all of the connected ETs. These can now start their plane comparison checks.

This technique works equally well for triplicated planes, or for even more planes if required.

The reduced throughput caused by the temporary restriction on the use of questions 2 and 3 lasts for such a short time that there is almost no chance of input queue overload under these conditions.

15. CONCLUSIONS

This specification describes in some detail the concepts and an outline of a possible implementation of an advanced ATM switch. This switch has the following key advantages:

a) This switch behaves as a single stage structure for blocking, cell loss and delay jitter.

b) The switch can do multicasting (fan out or broadcast) and fan in.

c) The switch grows from small to very large sizes, without the need for recabling.

d) One design supports the provision of high rate external interfaces, 600M, 2.4 G, 9.6 G etc., without a change to the core.

e) As technology improves the switch core can be progressively compacted and cost reduced without changes in logical operation.

f) The switch is entirely self routing and thus has no call setup overhead for path hunting.

g) The synchronous nature of the switch and self outing nature make 1:1 and 1:N operation of ports possible and easy, with very low changeover time.

h) The synchronous nature of the switch makes fault detection and location easier for the switch, than for an asynchronous design.

i) Dynamic bandwidth changes can be made to established connections without interruption to service, and without affecting other connections.

j) If the traffic load destined for one output port overloads, there is virtually no impact on the operation of the switch for traffic destined to other output ports.

k) The design is efficient in its implementation due to the fact that the internal bandwidth handled is only twice the switched bandwidth.

We claim:

1. A higher rate Asynchronous Transfer Mode (ATM) telecommunications switch for switching signals of a data rate higher than a normal port rate, comprising: a plurality of parallel data switching planes, a parallel control plane and a central switching unit for each data switching plane, each data plane having an equal number of input ports and output ports, the switching unit being arranged to switch any input port to any output port of the same data plane under the control of the control plane, at least one input port and one output port being higher rate ports for switching said higher data rate signals, wherein the higher rate input port has a plurality of links each to a separate input of the switching unit, and wherein the higher rate output port has the same number of said links each from a separate output of the switching unit thereto.

2. A telecommunications switch as claimed in claim 1, wherein the signals on the links are spaced one timeslot apart in phase.

3. A telecommunications switch as claimed in claim 1, wherein the links of each higher rate input port and the links of a corresponding linked higher rate output port form a set, and wherein there is a plurality of sets of links, the signals on the links being spaced one timeslot apart in phase, and wherein the signals of the sets are offset in time.

4. A telecommunications switch as claimed in claim 3, further comprising port controllers for sequentially establishing the sets of links, said port controllers being the portion of the parallel control plane which controls the output to a particular port.

5. A telecommunications switch as claimed in claim 2, further comprising rotator means for connecting each port cyclically to each timeslot of the central switching unit.

\* \* \* \* \*